United States Patent
Ibuki

(10) Patent No.: US 9,954,724 B2
(45) Date of Patent: Apr. 24, 2018

(54) WIRELESS TERMINAL, IMPORTANCE GENERATING METHOD, AND WIRELESS COMMUNICATION SYSTEM

(71) Applicant: FUJITSU LIMITED, Kawasaki-shi, Kanagawa (JP)

(72) Inventor: Jun Ibuki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 14/952,594

(22) Filed: Nov. 25, 2015

(65) Prior Publication Data

US 2016/0080197 A1 Mar. 17, 2016

Related U.S. Application Data

(63) Continuation of application No. PCT/JP2013/065227, filed on May 31, 2013.

(51) Int. Cl.
*H04L 12/24* (2006.01)
*H04W 84/18* (2009.01)
(Continued)

(52) U.S. Cl.
CPC ......... *H04L 41/0668* (2013.01); *H04W 84/18* (2013.01); *H04W 88/02* (2013.01);
(Continued)

(58) Field of Classification Search
CPC .................................................. H04L 41/0668
See application file for complete search history.

(56) References Cited

U.S. PATENT DOCUMENTS 6,907,257 B1 * 6/2005 Mizutani ............... H04W 36/30
370/335
7,653,003 B2 * 1/2010 Stine ...................... H04L 45/40
370/252

(Continued)

FOREIGN PATENT DOCUMENTS

| JP | 03-154536 | 7/1991 |
| JP | 2003-177945 | 6/2003 |

(Continued)

OTHER PUBLICATIONS

JPOA—Office Action dated Feb. 14, 2017 issued with respect to the corresponding Japanese Patent pplication No. 2015-519581 with full machine translation.

(Continued)

*Primary Examiner* — Andrew Lai
*Assistant Examiner* — Andrew C Lee
(74) *Attorney, Agent, or Firm* — Fujitsu Patent Center

(57) ABSTRACT

In a wireless terminal of a network system in which routes amongst a plurality of nodes are dynamically adjusted according to an environment, the wireless terminal forms a target node forming a final destination of data sent from a sending node. The wireless terminal computes a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system, and generates an importance representing an effect of a failure of the relaying node on the network system by a transmission failure probability.

18 Claims, 31 Drawing Sheets

(51) Int. Cl.
  *H04W 88/02* (2009.01)
  *H04L 12/751* (2013.01)
  *H04L 12/703* (2013.01)
  *H04W 40/02* (2009.01)

(52) U.S. Cl.
  CPC .............. *H04L 45/02* (2013.01); *H04L 45/28* (2013.01); *H04W 40/02* (2013.01)

(56) References Cited

U.S. PATENT DOCUMENTS

| | | | | |
|---|---|---|---|---|
| 2002/0186665 | A1* | 12/2002 | Chaffee | H04L 41/12 370/254 |
| 2003/0005149 | A1* | 1/2003 | Haas | H04L 12/1854 709/238 |
| 2004/0218582 | A1* | 11/2004 | Kennedy | H04L 1/1685 370/351 |
| 2004/0219909 | A1* | 11/2004 | Kennedy | H04L 45/14 455/422.1 |
| 2005/0169238 | A1* | 8/2005 | Yang | H04L 45/02 370/351 |
| 2005/0190784 | A1* | 9/2005 | Stine | H04L 45/40 370/445 |
| 2007/0070909 | A1* | 3/2007 | Reeve | H04L 45/00 370/238 |
| 2007/0140114 | A1* | 6/2007 | Mosko | H04L 43/00 370/229 |
| 2007/0195698 | A1* | 8/2007 | Briscoe | H04L 12/14 370/235 |
| 2008/0025270 | A1* | 1/2008 | Moon | H04W 40/14 370/338 |
| 2008/0240115 | A1* | 10/2008 | Briscoe | H04L 12/14 370/400 |
| 2010/0074113 | A1 | 3/2010 | Muramoto et al. | |
| 2011/0038274 | A1 | 2/2011 | Ikemoto et al. | |
| 2011/0164518 | A1* | 7/2011 | Daraiseh | H04L 45/121 370/252 |
| 2013/0077477 | A1* | 3/2013 | Daraiseh | H04W 40/14 370/225 |
| 2013/0250812 | A1* | 9/2013 | Rath | H04W 24/02 370/255 |
| 2014/0198666 | A1 | 7/2014 | Yamada et al. | |
| 2014/0348000 | A1* | 11/2014 | Izu | H04L 45/745 370/236 |

FOREIGN PATENT DOCUMENTS

| | | |
|---|---|---|
| JP | 2003-203021 | 7/2003 |
| JP | 2005-073067 | 3/2005 |
| JP | 2006-50377 | 2/2006 |
| JP | 2009-267532 | 11/2009 |
| JP | 2011-139240 | 7/2011 |
| JP | 2012-199703 | 10/2012 |
| WO | 2008-041434 | 4/2008 |
| WO | 2013/042209 A1 | 3/2013 |

OTHER PUBLICATIONS

International Search Report and Written Opinion of the International Searching Authority (Form PCT/ISA/210, Form PCT/ISA/237), mailed in connection with PCT/JP2013/065227 and dated Jul. 30, 2013 (13 pages).

* cited by examiner

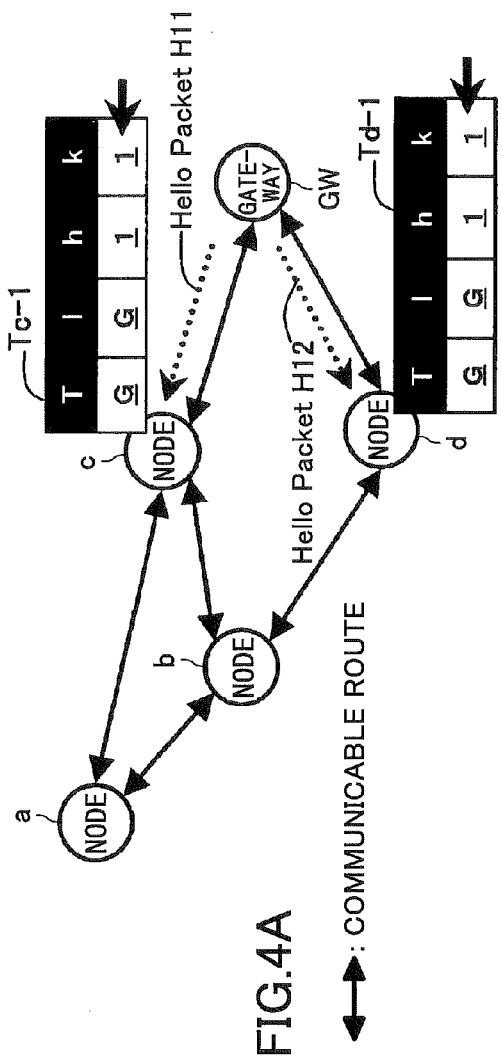
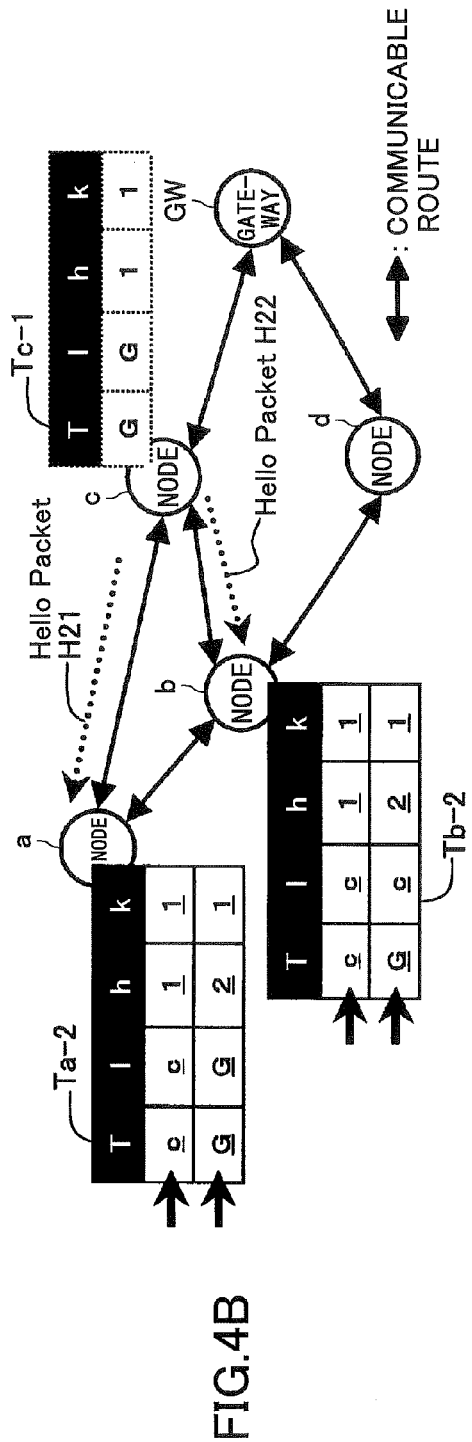
FIG.4A
FIG.4B

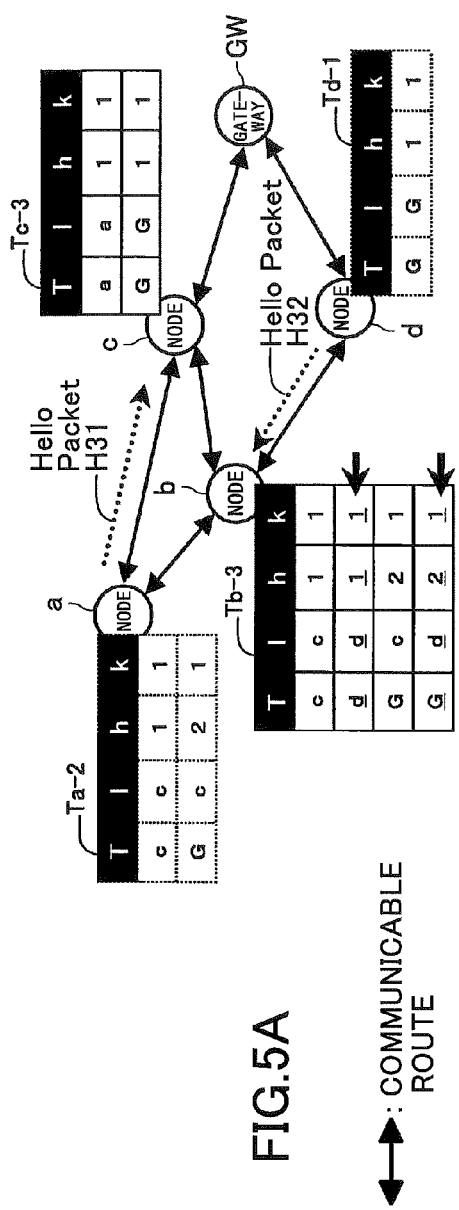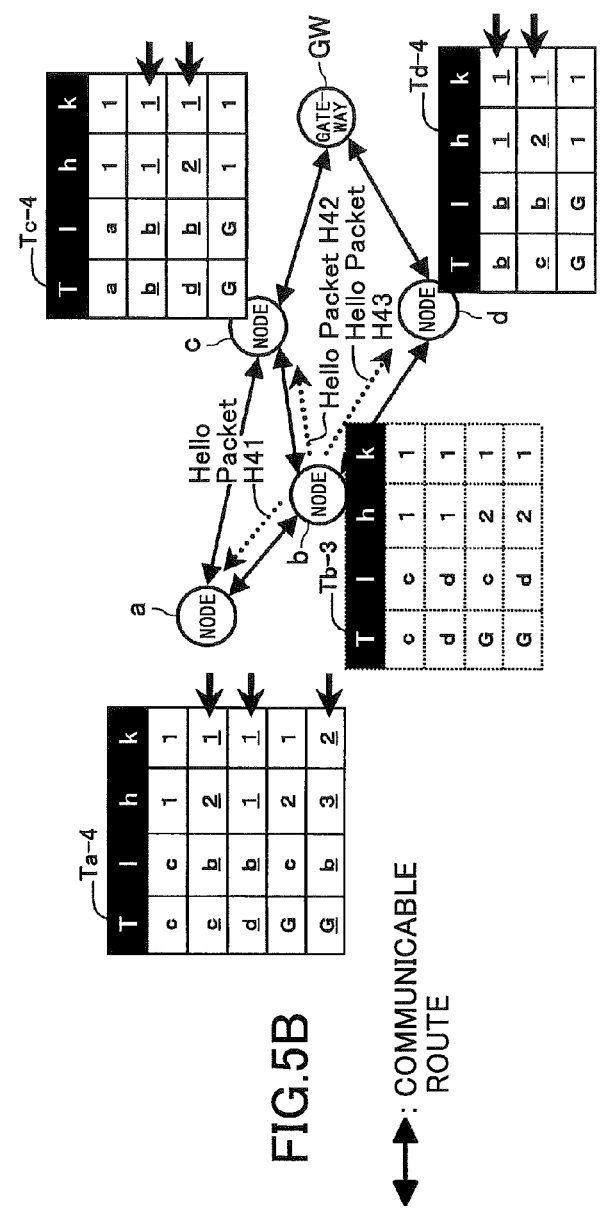
FIG.5A
FIG.5B
↕ : COMMUNICABLE ROUTE

——: ROUTE
-----: PARTITIONING POINT

FIG.16

| NODE | N = 1 | N = 2 | N = 3 | PARTITIONING PROBABILITY | NUMBER OF SUBSTITUTE ROUTES |
|---|---|---|---|---|---|
| b | i,e | | | 2*P | 1 |
| e | f,g,b | | | 3*P | 1 |
| f | e | b-i | g-h-i | P+P2+P3 | 3 |
| g | e | h-i,b-i | | P+2*P**2 | 2 |
| h | | e-f,e-g,b-i, b-e,g-i | | 5*P**2 | 3 |
| i | b | e-f,e-g,g-h | | P+4*P**2 | 3 |

FIG.23A

| TARGET NODE | DPS |
|---|---|
|  |  |

FIG.23B

| T | l | k | h | F | DPS |
|---|---|---|---|---|---|
| G | f | 3 | 3 |  |  |

FIG.25

| TARGET NODE | h | ROUTE QUALITY WEIGHT | ROUND-TRIP LINK WEIGHT | F | DPS |
|---|---|---|---|---|---|
|  |  |  |  |  |  |

FIG.29A

| TIME | SENDING NODE | FID | TTW | SENDING DESTINATION NODE | | | |
|---|---|---|---|---|---|---|---|
| | | | | LD1 | | LD2 | LD3 |
| 3599.9999 | a | 1 | 3600.9999 | 1 | g | 0 h | 0 i |

| TIME | SENDING NODE | FID | TTW | SENDING DESTINATION NODE | | | |
|---|---|---|---|---|---|---|---|
| | | | | LD1 | | LD2 | LD3 |
| 3599.9999 | a | 1 | 3601.9999 | 1 g | | 1 h | 0 i |

| TIME | SENDING NODE | FID | TTW | SENDING DESTINATION NODE | | | |
|---|---|---|---|---|---|---|---|
| | | | | LD1 | | LD2 | LD3 |
| 3601.9999 | a | 1 | 3602.9999 | 1 g | | 1 h | 1 i |

| NODE | DPS |
|------|-----|
|      |     |

FIG.31B

| NODE | IMPORTANCE |
|------|------------|
|      |            |

WIRELESS TERMINAL, IMPORTANCE GENERATING METHOD, AND WIRELESS COMMUNICATION SYSTEM

CROSS-REFERENCE TO RELATED APPLICATIONS

This application is a continuation application of International Application No. PCT/JP2013/065227 filed on May 31, 2013 and designated the U.S., the entire contents of which are incorporated herein by reference.

FIELD

The embodiments discussed herein are related to a wireless terminal, an importance generating method, and a wireless communication system.

BACKGROUND

Recently, an ad hoc network system has been proposed in which a plurality of wireless terminals mutually connect by themselves. In the ad hoc network system, no access point is set, and each wireless terminal relays a packet received from a wireless terminal mutually connected thereto to an adjacent wireless terminal based on routing information, so as to form a route according to an environment. For example, sensor data measured at each wireless terminal is relayed to one or a plurality of wireless terminals based on the generated route, and sent to a target wireless terminal, as proposed in Japanese Laid-Open Patent Publication No. 2012-199703 and No. 2009-267532, for example.

In the ad hoc network system described above, there are cases in which a failure such as a facility stop occurs due to a failure of the wireless terminal, insufficient power from a battery, or the like. When the failure of the wireless terminal occurs, the relaying wireless terminal cannot send or receive data, and the sensor data is not sent to the target wireless terminal in a case in which there is no substitute route to bypass the failed wireless terminal. With respect to the failed wireless terminal, a manual operation or maintenance is required to repair the failed wireless terminal, replace the battery or a component of the failed wireless terminal, or the like. However, in a case in which only limited personnel can cope with the the failure of the wireless terminal, it is difficult to immediately cope with the failure of the wireless terminal, particularly when the failure is generated in a large number of wireless terminals.

For example, minor failures may be generated in the wireless terminal. In this case, instead of immediately coping with each minor failure, an efficiency of coping with the minor failures can be improved by collectively coping with the minor failures after the minor failures are accumulated to a certain extent. On the other hand, it is desirable to immediately cope with a major failure generated in the wireless terminal. The major failure may be a loss of a large amount of sensor data, a network facility stop, or the like, for example.

In the case of the ad hoc network system, depending on the route that includes the wireless terminal in which the failure is generated, the relaying wireless terminal can be substituted by dynamically changing to a route that relays via another wireless terminal. However, depending on the location of the wireless terminal in which the failure is generated, there are cases in which the substitute route does not exist.

For this reason, it is desirable to set a priority of coping with the failure, based on an importance of the wireless terminal in which the failure is generated. The importance of the wireless terminal may be computed based on a number of substitute routes, a number of routes passing the target wireless terminal, or the like, for example.

However, the number of substitute routes is computed by aggregating adjacent tables of all of the wireless terminals within the ad hoc network system to a predetermined wireless terminal, for example, and computing the number of substitute routes based on routing information that is constructed from the adjacent tables of each of the wireless terminals. The adjacent table of one wireless terminal includes information of the wireless terminals that are adjacent to this one wireless terminal. Hence, an amount of communication required to collect the adjacent tables becomes considerably large, to thereby put a load on the ad hoc network system. In addition, a storage of the wireless terminal requires a storage capacity that is sufficiently large to store the adjacent tables. Furthermore, because the predetermined wireless terminal to which the adjacent tables are aggregated computes the substitute route by repeating a process similar to the construction of the routing information based on the adjacent tables, a large load is easily applied to the predetermined wireless terminal, and the process of the predetermined wireless terminal requires a long time to perform.

According to the related art, it takes time to perform the process of computing the importance of the effects of the mobile terminal in which the failure is generated on the entire ad hoc network system, and the wireless terminal may easily assume a high-load state. For this reason, it takes time to judge, based on the importance, whether a prioritized maintenance is to be performed with respect to the wireless terminal in which the failure is generated.

Other related art includes Japanese Laid-Open Patent Publications No. 2003-203021 and No. 2003-177945, for example.

SUMMARY

Accordingly, it is an object in one aspect of the embodiments to provide a wireless terminal, an importance generating method, and a wireless communication system, in which an importance of a wireless terminal can be computed within a short time.

According to one aspect of the embodiments, a wireless terminal of a network system in which routes amongst a plurality of nodes are dynamically adjusted according to an environment, wherein the wireless terminal forms a target node forming a final destination of data sent from a sending node, and the wireless terminal includes a processor configured to perform a process that includes computing a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system; and generating an importance representing an effect of a failure of the relaying node on the network system by a transmission failure probability.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are diagrams for explaining an example of a routing information generating process based on Hello packets;

FIGS. 5A and 5B are diagrams for explaining the example of the routing information generating process based on the Hello packets;

FIG. 16 is a diagram illustrating an example of a sending source node, a number of nodes forming a partitioning point, an approximation value of partitioning probability, and a number of substitute routes in the ad hoc network system illustrated in FIG. 15;

FIGS. 23A and 23B are diagrams illustrating an example of the partitioning point set and a routing table at the node;

FIG. 25 is a diagram illustrating an example of a Hello header;

FIGS. 29A, 29B, and 29C are diagrams illustrating an example of records of a data management table;

FIGS. 31A and 31B are diagrams illustrating an example of a partitioning point table and an importance table at the target node.

DESCRIPTION OF EMBODIMENTS

In the disclosed wireless terminal, importance generating method, and wireless communication system, an importance of effects of a failure in each relaying node on an entire network system, such as an ad hoc network system, is represented by a transmission failure probability of the network system in which routes amongst nodes are dynamically adjusted according to an environment. More particularly, a partitioning probability indicating whether transmission fails by partitioning a location with respect to each pair of a sending source node and a sending destination node, is checked to estimate the effects of the failure generated at each node on the data transmission in the network system. The higher the partitioning probability, the higher the importance.

Hence, in a case in which an evaluation value of a route is computed from the importance of each node for each of the multiplexed nodes in the network system including a large number of nodes, it is possible to assign a priority order to a node that becomes a maintenance target based on the evaluation value, and narrow down the nodes that are maintenance targets.

Preferred embodiments of the present invention will be described with reference to the accompanying drawings.

A description will now be given of the wireless terminal, the importance generating method, and the wireless communication system in each embodiment according to the present invention.

Figure 1:
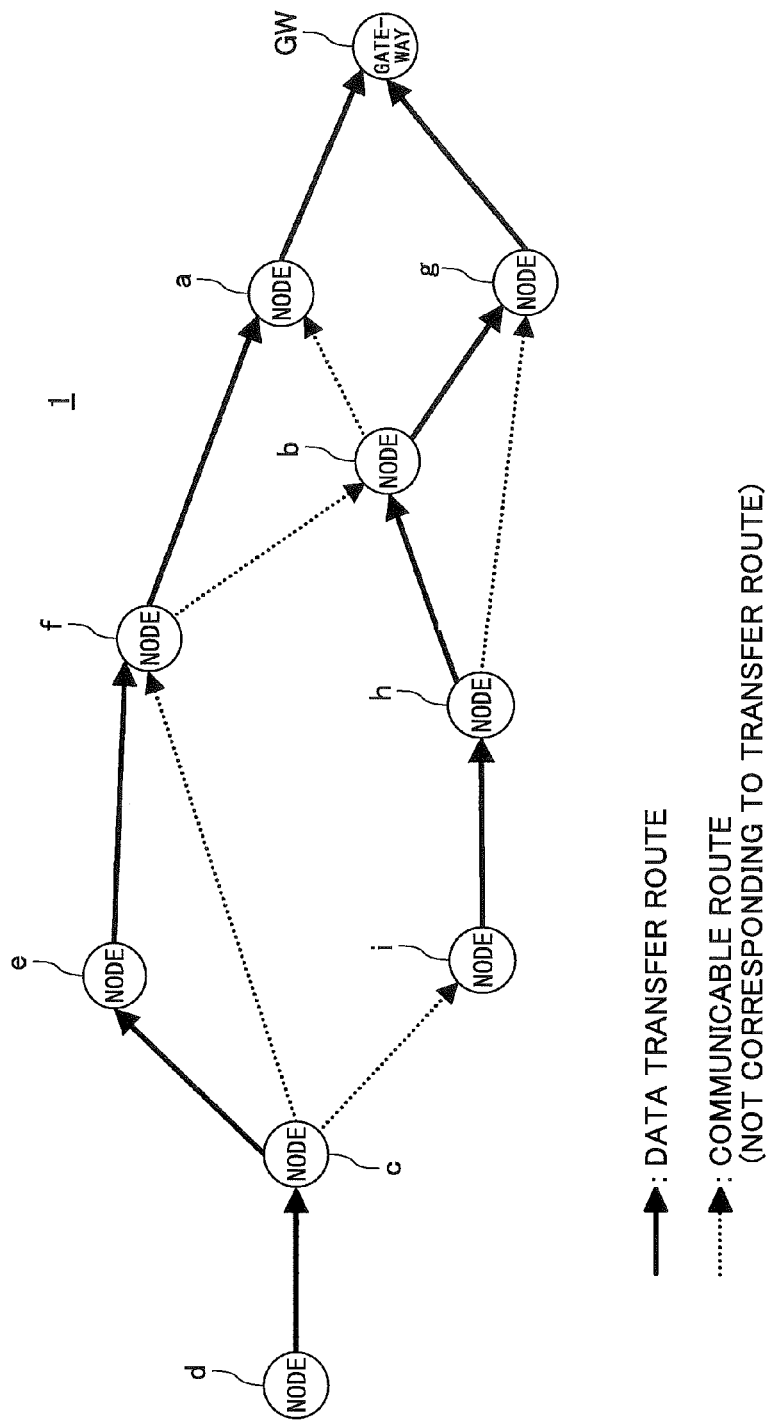
FIG. 1 is a diagram illustrating an example of an entire configuration of an ad hoc network system.

FIG. 1 is a diagram illustrating an example of an entire configuration of an ad hoc network system. An ad hoc network system 1 illustrated in FIG. 1 is an example of a wireless communication system, and includes a gateway GW and wireless terminals a through i in this example. The gateway GW and the wireless terminals a through i are example of a node (or node apparatus), and may have the same configuration.

In the ad hoc network system 1, the wireless terminals a through i perform a self-routing and a multi-hop communication. In this example, a solid line arrow indicates a data transfer route generated by the routing, and a dotted line arrow indicates a route through which the nodes may mutually communicate but does not correspond to a transfer route. For example, sensor data measured at the wireless terminal d reaches the gateway GW via the wireless terminals c, e, f, and a.

Figure 2:
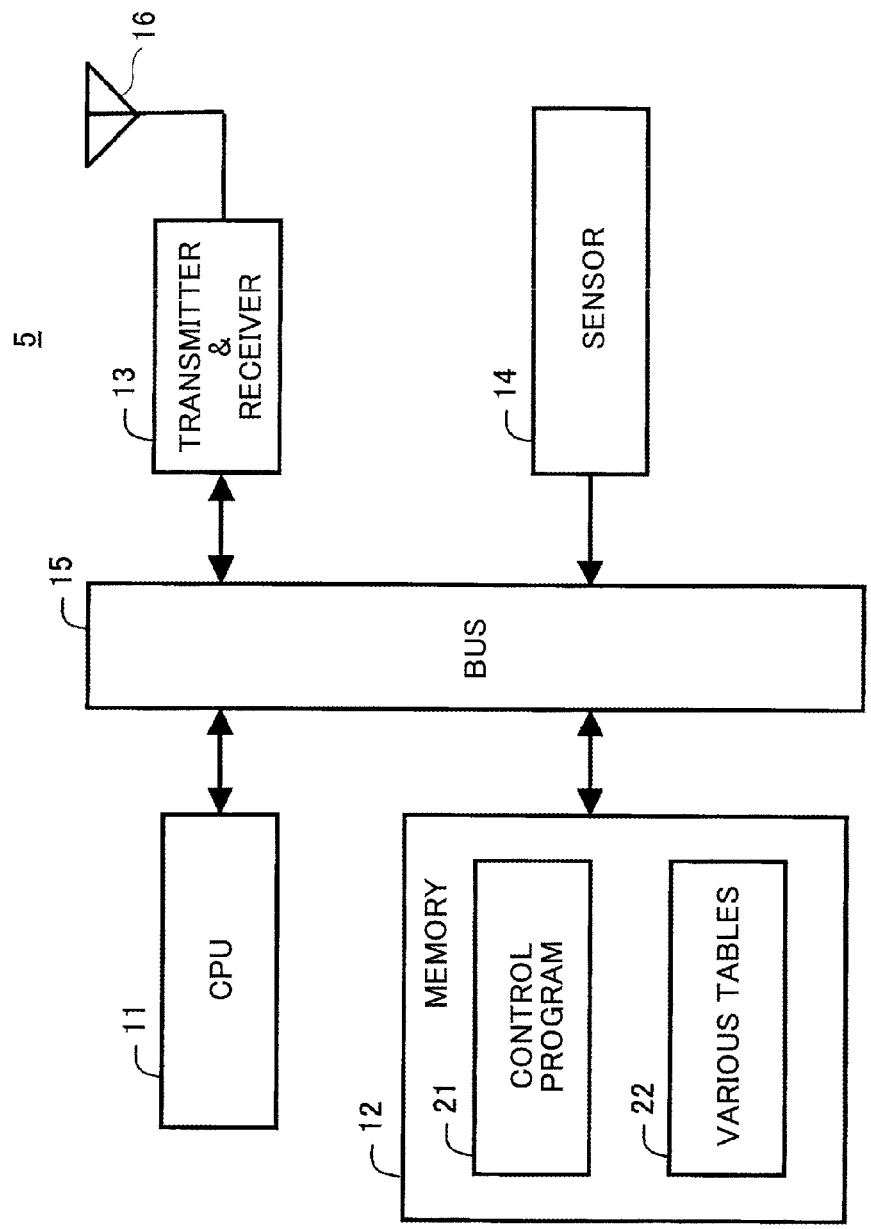
FIG. 2 is a block diagram illustrating an example of a configuration of a node in one embodiment.

FIG. 2 is a block diagram illustrating an example of a configuration of the node in one embodiment. A node 5 illustrated in FIG. 2 includes a CPU (Central Processing Unit) 11 that is an example of a processor, a memory 12 that is an example of a storage unit or a non-transitory computer-readable storage medium, a transmitter and receiver 13, and a sensor 14. The CPU 11, the memory 12, the transmitter and receiver 13, and the sensor 14 are mutually connected via a bus 15.

The memory 12 stores various programs including a control program 21, and various tables 22, for example. The CPU 11 executes the control program 21, for example, to perform an importance generating process or the like which will be described later, and generates the various tables 22 or the like. The processes performed by the CPU 11 may be performed by dedicated hardware. The sensor 14 generates sensor data by measuring a predetermined target, for example. The transmitter and receiver 13 transmits and receives, via an antenna 16, data packets including the sensor data or the like, and control packets for communication, under the control of the CPU 11.

Figure 3:
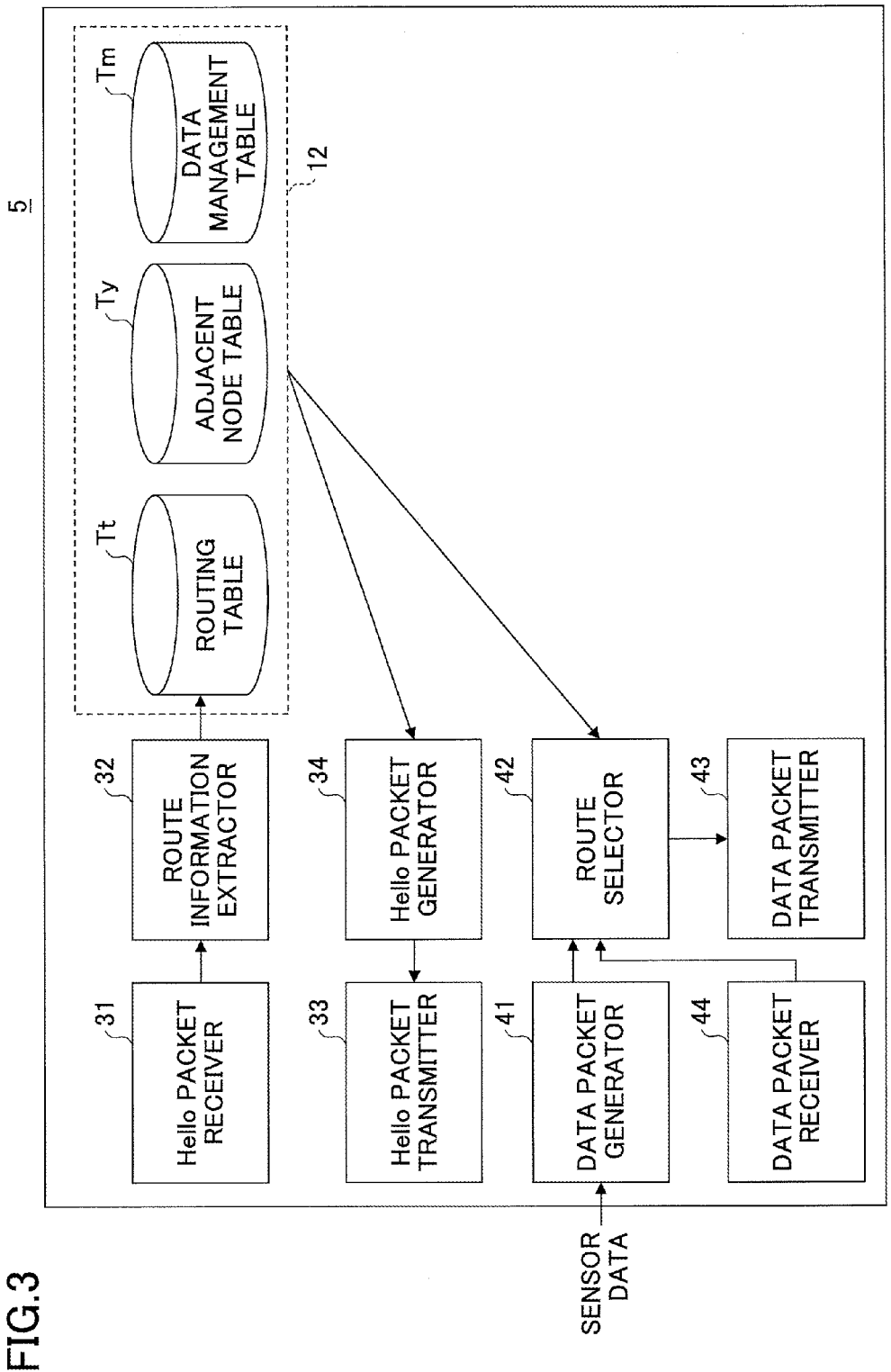
FIG. 3 is a functional block diagram of the node.

FIG. 3 is a functional block diagram of the node. The node 5 illustrated in FIG. 3 includes a Hello packet receiver 31, a Hello packet transmitter 33, a Hello packet generator 34, a routing information extractor 32, a routing table Tt, and an adjacent table Ty. The routing table Tt and the adjacent table Ty are included in the various tables 22. The routing table Tt stores routing information indicating a route for sending packets from the sending source node 5 to a sending destination node 5, for example. The adjacent table Ty stores information of adjacent nodes 5.

The Hello packet receiver 31 receives Hello packets. The routing information extractor 32 extracts the routing information and the number of routes from data included in the received Hello packets, and stores the extracted routing information and the number of routes in the routing table Tt. The Hello packet generator 34 generates Hello packets including the routing information and the number of routes, by referring to the routing table Tt. The Hello packet transmitter 33 sends the generated Hello packets.

The node 5 further includes a data packet generator 41, a route selector 42, a data packet transmitter 43, and a data packet receiver 44. The data packet generator 41 generates data packets. The data packets include predetermined data, and are sent to from the sending source node 5 to the sending destination source 5.

The route selector 42 computes a partitioning point set (or dividing point set) of the node 5 by referring to the routing table Tt, adds the partitioning point set of the node 5 to the data part of the data packets, and selects from the routing table Tt the sending destination node 5 that is to become the sending destination. The data packet transmitter 43 sends the data packets including the sensor data. The data packet receiver 44 receives the data packets.

FIGS. 4A through 8 are diagrams for explaining an example of a routing information generating process based on the Hello packets in this embodiment. FIGS. 4A through 8 illustrate a part of the ad hoc network 1 of this embodiment. In the example illustrated in FIGS. 4A through 8, GW denotes the gateway. In this example, the routing table Tt includes a sending destination node T including the target node, an adjacent node 1 (link) in the route to the sending destination node T, a number of hops, h, to the sending destination node T, and a number of routes, k, between the node to which the routing table Tt belongs and the sending destination node T. In the routing table Tt, the gateway GW is represented as G for the sake of convenience. The routing table Tt further includes a change flag F and a partitioning point set DPS, however, a description on the change flag F and the partitioning point set DPS will be given later.

In this embodiment, control packets called Hello packets are used to generate the routing information. The node 5 periodically broadcasts the Hello packets. The node 5 transmits and receives the Hello packets and exchanges the routing information with other nodes 5, to generate the routing table Tt. In addition, in this embodiment, the Hello packets include the number of routes in addition to the routing information.

When the node 5 receives the Hello packets, the node 5 updates the routing table Tt thereof based on the routing information included in the received Hello packets. More particularly, when the node 5 receives the Hello packets, the node 5 adds to the routing table Tt thereof, the routing information that does not exist in the routing table Tt and the number of routes, k, obtained from the routing information included in the received Hello packets. In addition, in a case in which the received Hello packets include routing information having a smaller number of hops, h, than that in the routing information of the routing table Tt, the node 5 performs an overwrite by writing the routing information included in the received Hello packets over the routing information of the routing table Tt. Moreover, in a case in which the sending destination node T and the link 1 have a plurality of routes that are the same, the node 5 registers a sum total of the number of routes in the routing table Tt. The routing table Tt is generated in the above described manner.

In FIG. 4A, the gateway GW sends Hello packets H11 and H12 indicating that this gateway GW exists on the network, to adjacent nodes c and d, for example. The node c generates the routing information based on the received Hello packet H11, and stores the generated routing information in a routing table Tc-1. More particularly, the node c generates the routing information indicating that the number of hops, h, from the node c to the gateway GW (T), is 1. The number of routes between the node c and the gateway GW is 1. For this reason, the number of routes, k, which is 1, is registered in the routing table Tc-1.

In FIG. 4A, the node d similarly receives the Hello packet H12 sent from the gateway GW. Based on the received Hello packet H12, the node d generates the routing information indicating that the number of hops, h, from the node d to the gateway GW (T) is 1, and the number of routes, k, between the node d and the gateway GW, which is 1, and stores the routing information and the number of routes in a routing table Td-1. Accordingly, when initially generating the route to the adjacent node 5, each node 5 sets the number of routes, k, to 1.

FIG. 4B illustrates a case in which the node c sends Hello packets H21 and H22 to the nodes a and b. In this case, the Hello packet H21 includes the routing information indicating that the number of hops, h, from the node c to the gateway GW is 1. Hence, based on the routing information included in the Hello packet H21, the node a adds to a routing table Ta-2 routing information indicating the link to the node c (l) and the number of hops, h, to the gateway GW (T), that is 2, and the number of routes, k, that is 1. In this state, the number of routes, k, included in the Hello packet is transferred to the routing table. Hence, the link (1) and the number of hops, h, of the routing information included in the Hello packet H21 are changed, and are added to the routing table Ta-2 of the node a, to thereby extend the routing information. In addition, the node a adds to the routing table Ta-2 routing information indicating the number of hops, h, to the node c (T), that is 1, and the number of routes, k, that is 1.

The node b adds to a routing table Tb-2 routing information indicating the number of hops, h, to the node c (T), that is 1, and the number of routes, k, that is 1, and also routing information indicating the link to the adjacent node c (l) and the number of hops, h, to the gateway GW (T), that is 2, and the number of routes, k, that is 1. The routing information is extended in this manner by propagation of the Hello packets.

FIGS. 5A and 5B are diagrams for further explaining the example of the routing information generating process based on the Hello packets. In FIG. 5A, when the node a sends a Hello packet H31 to the node c, the node c generates routing information based on the routing information included in the Hello packet H31. In this case, the Hello packet H31 includes routing information indicating the link to the node c (l) and the number of hops, h, to the gateway GW (T), that is 2. However, a routing table Tc-3 of the node c already includes routing information indicating that the number of hops, h, to the gateway GW (T), is 1. In this case, the node c does not need to add to the routing table Tc-3 inefficient routing information indicating the link to the node a (l) and the number of hops, h, to the gateway GW (T), that is 3.

As described above, the route added to the routing table may be restricted based on the number of hops, h, corresponding to a route length. In the example illustrated in FIG. 5A, amongst routes to the same sending destination gateway GW (T) in the routing table, routes (route linking to the node a in this example) having a number of hops, h, that is 3 or more, and larger than a minimum number of hops, h, to the sending destination gateway GW (T), that is 1, by 2 hops or more, may be excluded. By excluding the routes based on the number of hops, h, it is possible to exclude inefficient routes from the routing table. As a result, it is possible to avoid a computation error when computing the number of routes that are utilizable as important routes, for example.

In addition, in FIG. 5A, when the node b receives the Hello packet H32 from the node d, the node b adds to a routing table Tb-3 routing information indicating the number of hops, h, to the node d (T), that is 1, and the number of routes, k, that is 1, and routing information indicating the link to the node d (l) and the number of hops, h, to the gateway GW (T), that is 2, and the number of routes, k, that is 1.

In FIG. 5B, the node b sends Hello packets H41 through H43 to the node a and the node d. When the node a receives the Hello packet H41 from the node b, the node a adds to a routing table Ta-4 routing information of the routes to the node b (T) and indicating the number of routes, k, that is 1, and routing information of routes to the node c (T) linking to the node b (l), and indicating the number of routes, k, that is 1. On the other hand, the routing table Tb-3 of the node b includes two routing information having the gateway GW as the destination node (T) and linking to the node c (l) for one routing information and linking to the node d (l) for the other routing information. For this reason, the node a adds to the routing table Ta-4 routing information indicating the link to the adjacent node b (l) and routes to the gateway GW (T), and the number of routes, k, that is 2. Hence, in a case in which a plurality of routes exist to the link (l) and the sending destination node (T), the node 5 stores in the routing table a sum of the number of routes of each of the links. Similarly, routing tables Tc-4 and Td-4 are updated based on the Hello packets H42 and H43.

In the case in which a plurality of routes exist to the link (l) and the sending destination node (T), the sum of the routes is stored in the routing table of the node 5 as the number of routes between the node 5 and the sending destination node (T) relaying the link (l). Hence, based on the routing table, it is possible to detect the number of routes, k, in addition to the routing information.

Figure 6:
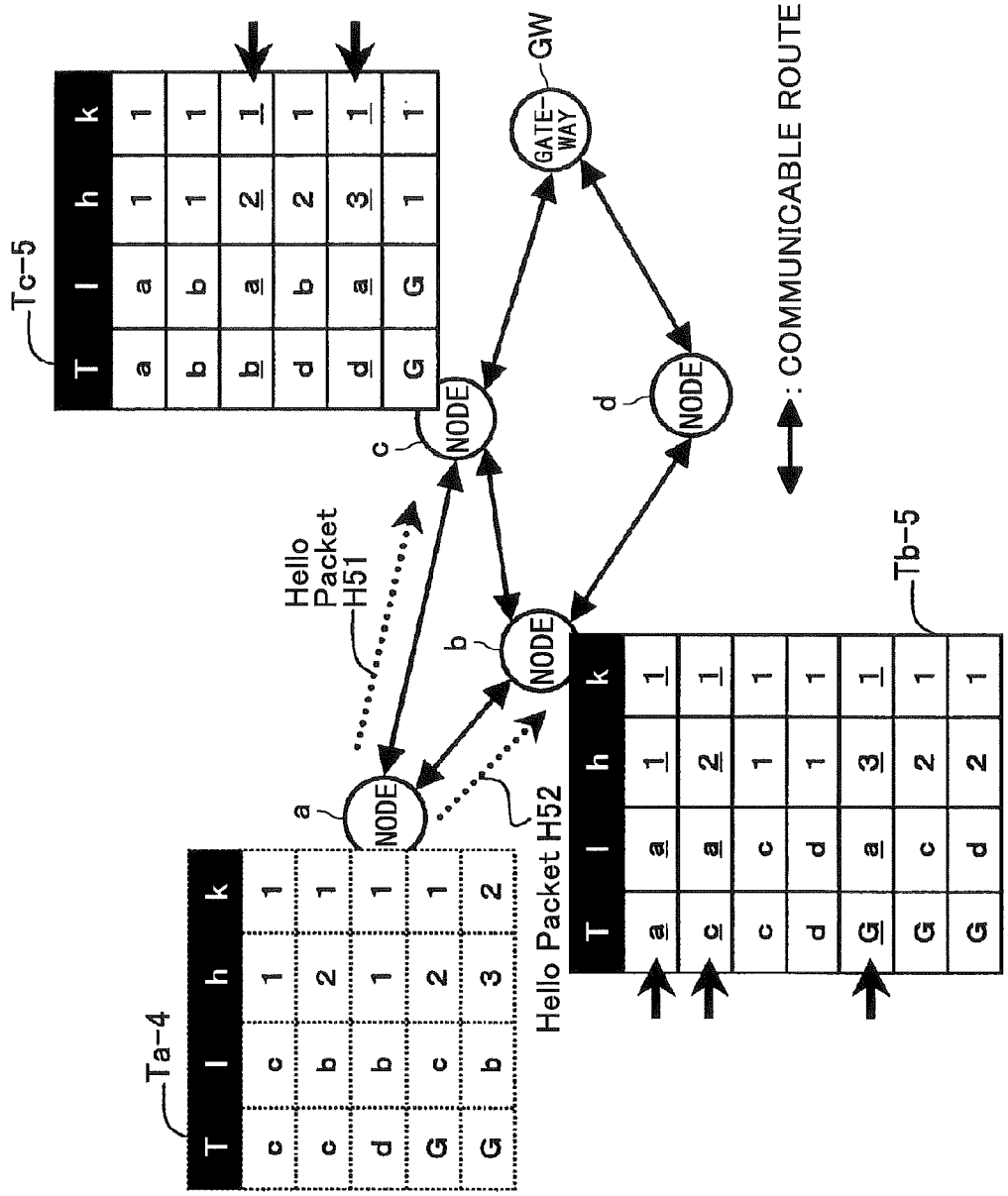
FIG. 6 is a diagram for explaining the example of the routing information generating process based on the Hello packets.

FIG. 6 is a diagram for further explaining the example of the routing information generating process based on the Hello packets. In FIG. 6, the node a sends Hello packets H51 and H52 to the node b and the node c. Accordingly, 3 routing information of routes having the node a as the link (l), and the number of routes, k, are added to a routing table Tb-5 of the node b. In addition, 2 routing information of routes having the node a as the link (l), and the number of routes, k, are added to a routing table Tc-5 of the node c.

Figure 7:
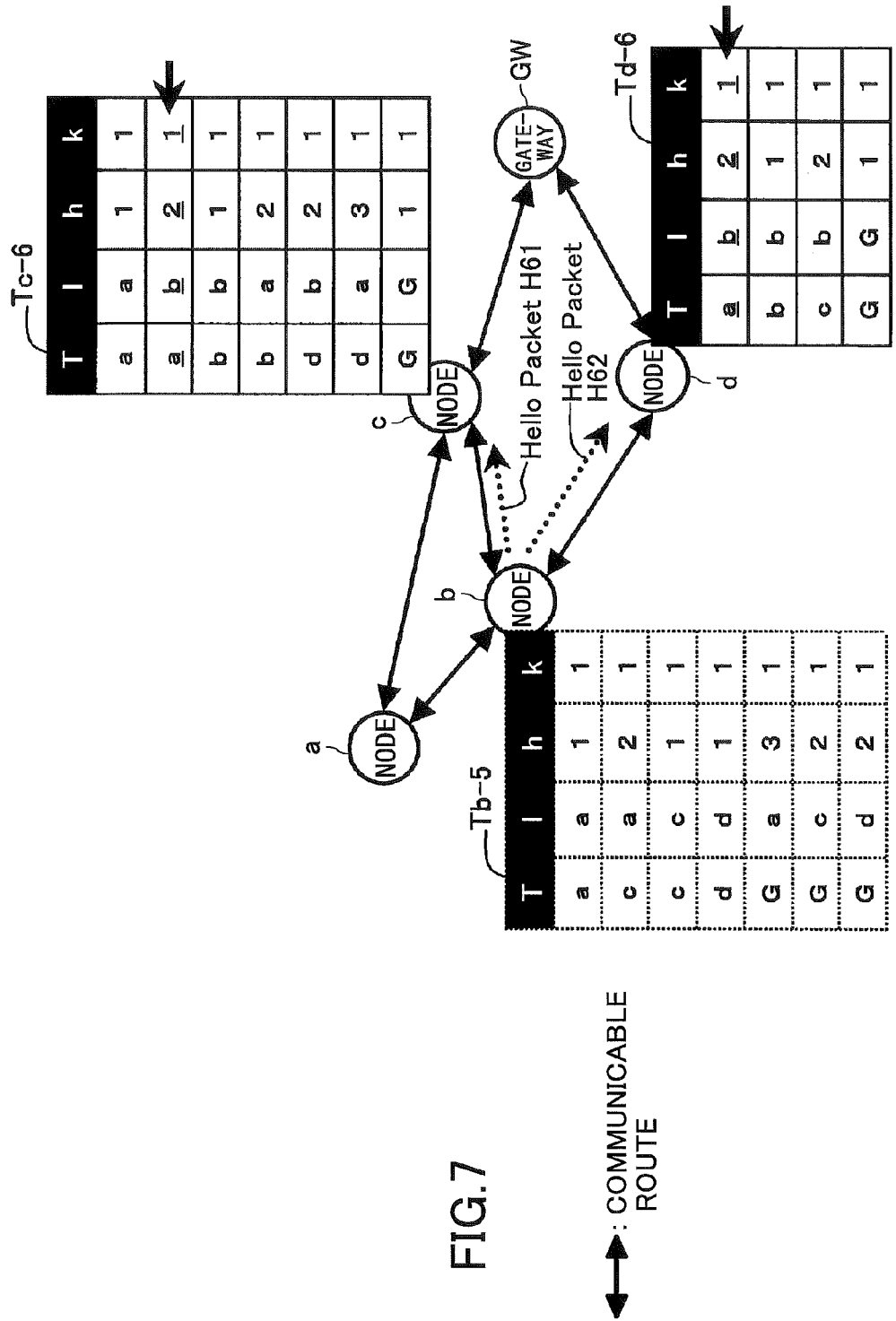
FIG. 7 is a diagram for explaining the example of the routing information generating process based on the Hello packets.

FIG. 7 is a diagram for further explaining the example of the routing information generating process based on the Hello packets. In FIG. 7, the node b sends Hello packets H61 and H62 to the node c and the node d. A routing table Tc-6 of the node c already includes the routing information of routes having the node b as the link (l), but does not include routing information of routes to the sending destination node a (T) and having the node b as the link (l). For this reason, the node c adds to the routing table Tc-6 the routing information of the routes to the sending destination node a (T) and having the node b as the link (l), and the number of routes, k, that is 1. Similarly, the node d adds to a routing table Td-6 routing information of routes to the sending destination node a (T) and having the node b as the link (l), and the number of routes, k, that is 1.

Figure 8:
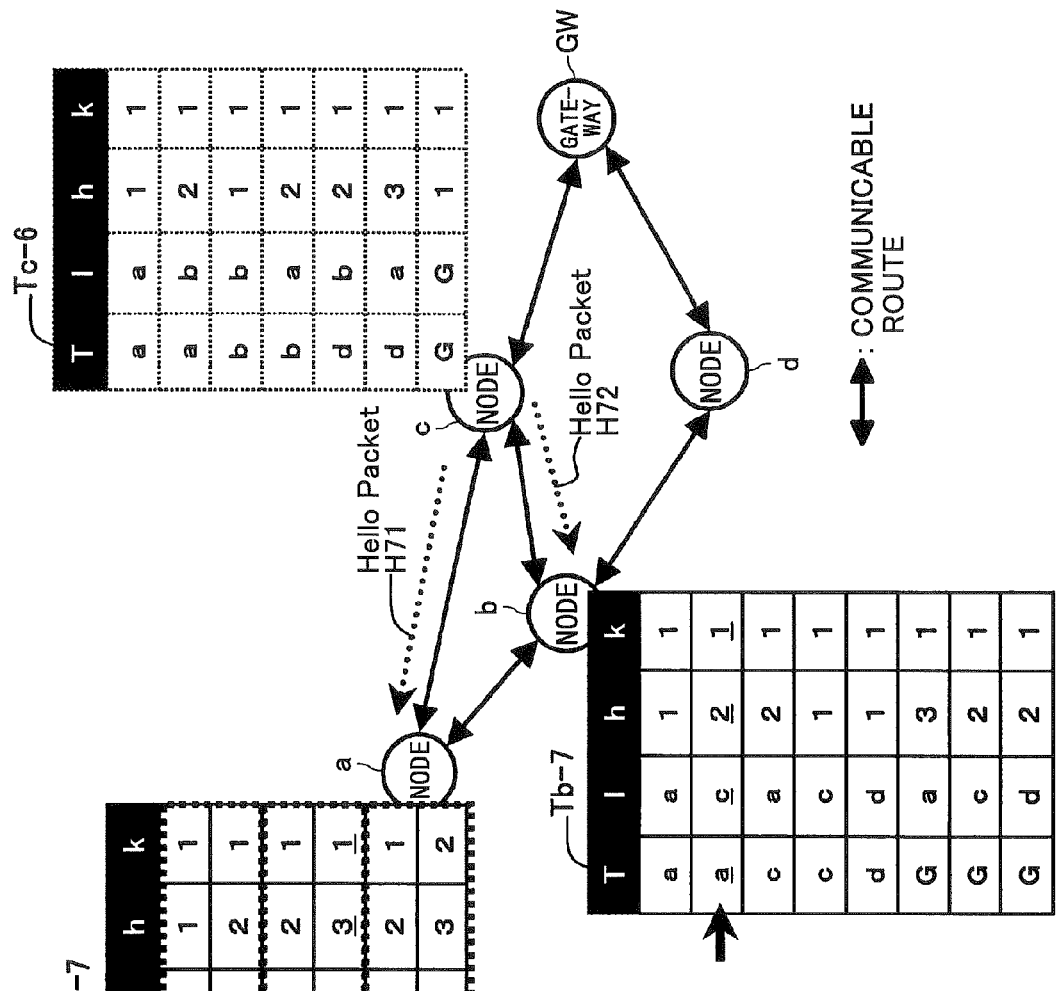
FIG. 8 is a diagram for explaining the example of the routing information generating process based on the Hello packets.

FIG. 8 is a diagram for further explaining the example of the routing information generating process based on the Hello packets. In FIG. 8, the node c sends Hello packets H71 and H72 to the node a and the node b. Similarly as in the case illustrated in FIG. 7, the node a adds to a routing table Ta-7 routing information of routes to the sending destination node d (T) and having the node c as the link (l), and the number of routes, k, that is 1. Similarly, the node b adds to a routing table Tb-7 routing information of routes to the sending destination node a (T) and having the node c as the link (l), and the number of routes, k, that is 1.

Therefore, depending on the propagation routes of the Hello packets, a routing table having a plurality of routes for the same sending destination node is generated. For example, as surrounded by a dotted line in FIG. 8, the routing table Ta-7 of the node a includes a total of 2 routes having the node c as the sending destination node, a total of 2 routes having the node d as the sending destination node, and a total of 3 routes having the gateway GW as the sending destination node.

Figure 9:
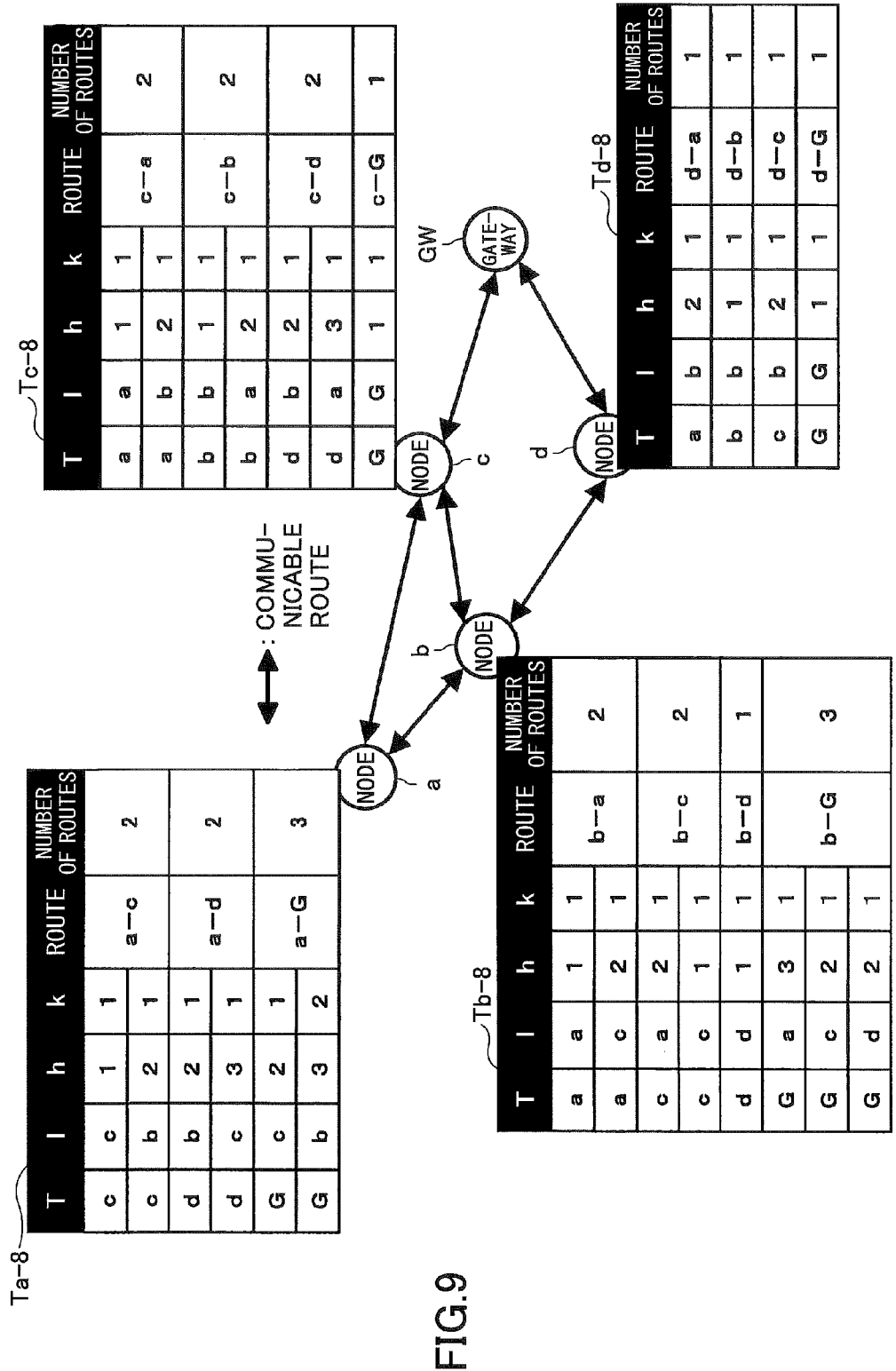
FIG. 9 is a diagram for explaining an example of each route and a number of routes included in the routing information.

FIG. 9 is a diagram for further explaining an example of each route and a number of routes included in the routing information. Routing tables Ta-8 through Td-8 illustrated in FIG. 9 include, in addition to the information of the routing tables illustrated in FIG. 8, a total number of routes between the sending source node corresponding to the routing information and the sending destination node (T).

As described above, the routing table Ta-8 of the node a illustrated in FIG. 9 includes, as the routes between the node a and the gateway GW (T), 1 route "node a→node c→gateway GW" having the adjacent node c as the link (l), and 2 routes "node a→node b→node c→gateway GW" and "node a→node b→node d→gateway GW" having the adjacent node b as the link (l). In other words, the routing table Ta-8 of the node a includes 3 routes having the gateway GW (T) as the sending destination.

Similarly, the routing table Ta-8 of the node a illustrated in FIG. 9 includes, as the routes between the node a and the node d (T), 1 route "node a→node c" having the adjacent node c as the link (l), and 1 route "node a→node b→node c" having the adjacent node b as the link (l). This means that the routing table Ta-8 includes 2 routes having the node c as the sending destination. Similarly, the routing table Ta-8 of the node a illustrated in FIG. 9 includes, as the routes between the node a and the node d(T), 2 routes "node a→node b→node d" and "node a→node c→gateway GW→node d" having the node d(T) as the sending destination.

In addition, a routing table Tb-8 of the node b illustrated in FIG. 9 includes, as routes to the gateway GW (T) at the sending destination, routes having links to the node a, the node c, and the node d. In other words, the routing table Tb-8 includes 3 routes having the gateway GW (T) as the sending destination. In addition, the routing table Tb-8 includes 2 routes having the node a as the sending destination, 2 routes having the node c as the sending destination, and 1 route having the node d as the sending destination. Routing tables Tc-8 and Td-8 of the other nodes c and d are formed in a manner similar to the above.

According to this embodiment, because the number of routes is added to the Hello packet, it is possible to compute the number of routes between one node 5 and the sending destination node 5, in addition to the routing information between the one node 5 and the sending destination node 5.

The node 5 extracts, while relaying the data packet, the number of routes between the sending source node 5 and the sending destination node 5 of the data packet.

Figure 10:
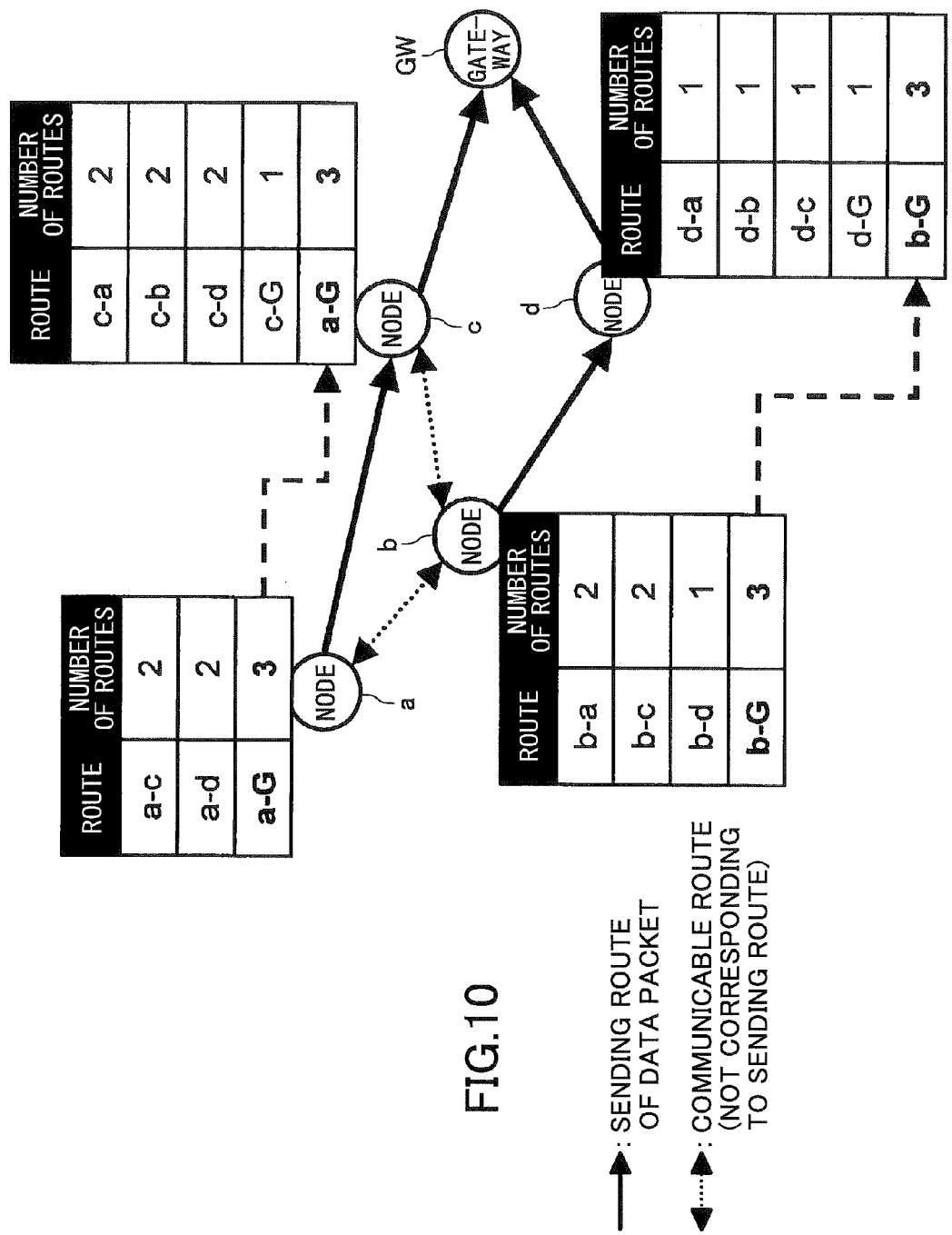
FIG. 10 is a diagram for explaining an example of an extracting process to extract a number of routes between a sending source node and a sending destination node.

FIG. 10 is a diagram for explaining an example of an extracting process to extract the number of routes between the sending source node and the sending destination node. In this example, a solid line arrow indicates a sending route of the data packet, while a dotted line arrow indicates a route through which the nodes may mutually communicate but does not correspond to the sending route of the data packet.

In the example illustrated in FIG. 10, the node a sends the data packet including the measured sensor data to the gateway GW via the node c, for example. In this case, the node a corresponds to the sending source node, and the gateway GW corresponds to the sending destination node. In addition, in the example illustrated in FIG. 10, the node b sends the data packet including the measured sensor data to the gateway GW via the node d. In this case, the node b corresponds to the sending source node, and the gateway GW corresponds to the sending destination node. Each of the nodes c and d may become the sending source node.

First, a description will be given of a case in which the data packet is sent from the node a to the gateway GW at the sending destination. In this case, the sending source node a adds to the data packet a total number of routes between the sending source node a and the sending destination gateway GW, that is 3. While relaying the data packet, the relaying node c extracts the total number of routes between the sending source node a and the sending destination gateway GW, that is 3, from the data packet. In a case in which the data packet is sent from the sending source node b to the sending destination gateway GW, the total number of routes between the sending source node b and the sending destination gateway GW is added to the data packet in a similar manner. Further, while relaying the data packet, the relaying node d extracts the total number of routes between the sending source node b and the sending destination gateway GW, that is 3, from the data packet. Hence, in this embodiment, the total number of routes between the sending source node and the sending destination node is communicated to each relaying node.

By adding the total number of routes between the sending source node 5 and the sending destination node 5 to the existing data packet, the total number of routes is efficiently communicated to the relaying node 5. On the other hand, the load on the network does not increase, because the size of a field to store the total number of routes may be small and the sending of the total number of routes in the data packets does not increase the number of data packets.

Figure 11:
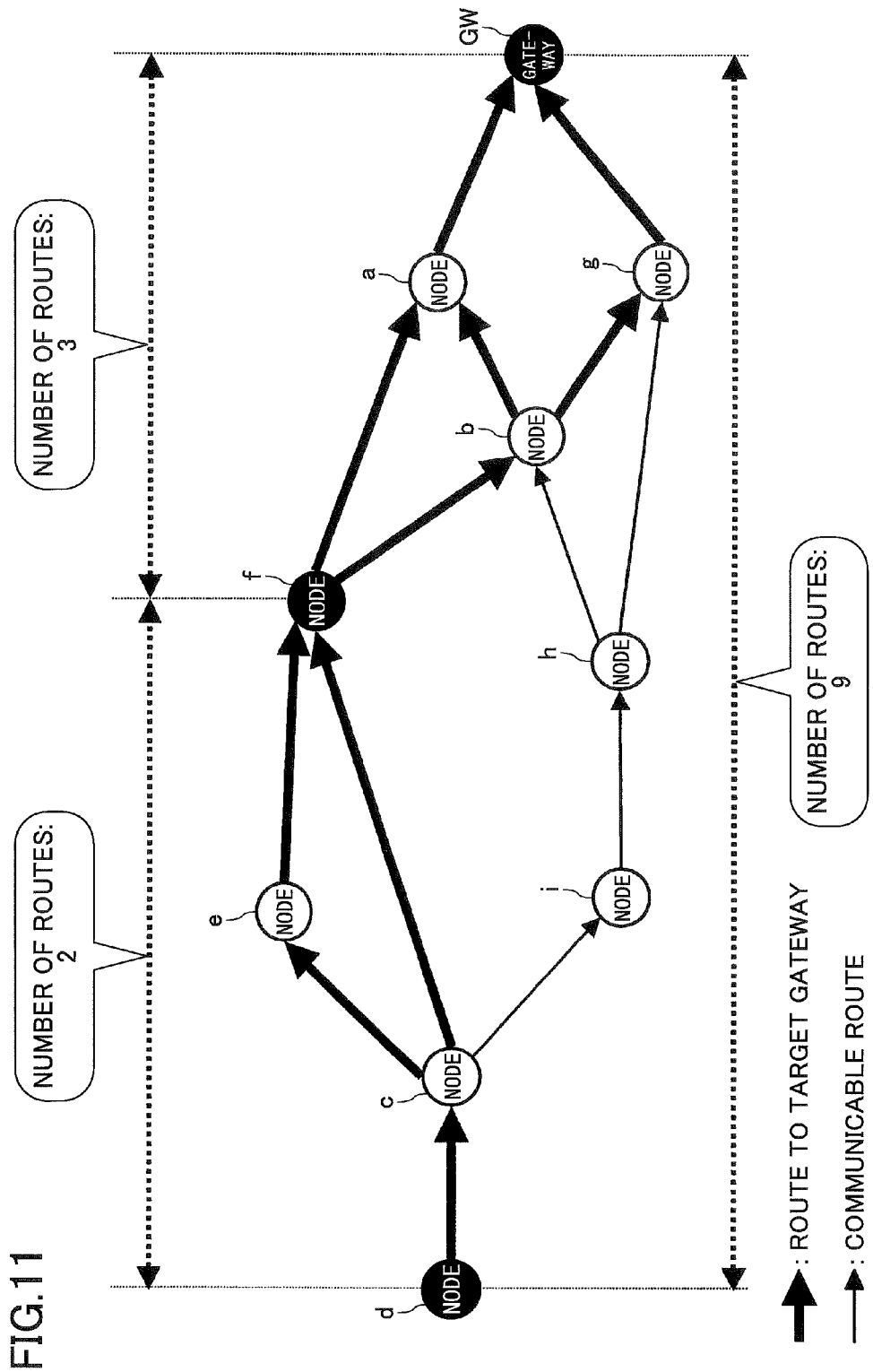
FIG. 11 is a diagram for explaining an example of a computing method to compute a number of substitute routes.

Next, a description will be given of an example of a computing method to compute a number of substitute routes. FIG. 11 is a diagram for explaining this example of the computing method to compute the number of substitute routes. In the example illustrated in FIG. 11, the node d is a sending node 5 of the data packet, and the gateway GW is a target node 5. In this example, the computing method computes the number of substitute routes of a relaying node f in the routes from the sending node d to the target gateway GW. In this embodiment, the number of substitute routes can be computed based on a formula [(total number of routes from sending node to target node)−(number of routes relaying nodes)]. In addition, the number of routes relaying the nodes is represented by [(number of routes between node and sending node)×(number of routes between node and target node)].

In the example illustrated in FIG. 11, the number of routes between the sending node d and the target gateway GW is 9. In addition, the number of routes between the sending node d and the relaying node f is 2, and the number of routes between the relaying node f and the target gateway GW is 3. Accordingly, a product (=2×3) of the number of routes, 2, between the sending node d and the relaying node f, and the number of routes, 3, between the relaying node f and the target gateway GW, is subtracted from the total number of routes, 9, between the sending node d and the target gateway GW. It is thus possible to compute the number of substitute routes, 3 (=9−2×3), of the relaying node f in the routes between the sending node d and the target gateway GW.

In this example, the number of substitute routes is computed for the node f, however, the number of substitute routes can be computed in a similar manner for other relaying nodes 5. In addition, the number of substitute routes at one relaying node 5 differs depending on the sending node 5 and the target node 5 of the data packet.

Figure 12:
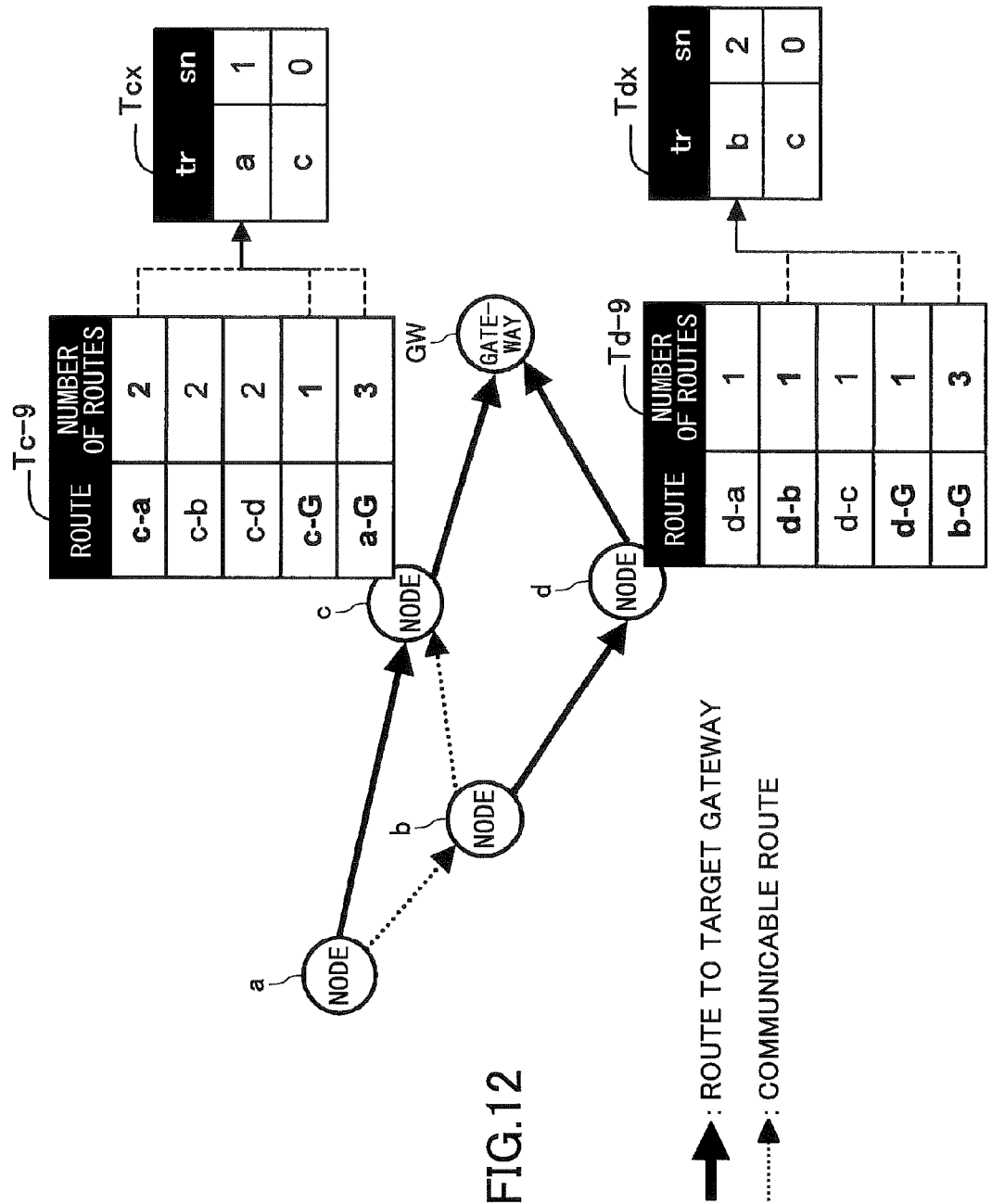
FIG. 12 is a diagram for explaining an example of the number of substitute routes in the examples illustrated in FIGS. 4A through 8.

Next, a description will be given of an example of the number of substitute routes. FIG. 12 is a diagram for explaining the example of the number of substitute routes in the examples illustrated in FIGS. 4A through 8. FIG. 12 illustrates route number tables Tc-9 and Td-9 and substitute route number tables Tcx and Tdx of the nodes c and d. The route number tables Tc-9 and Td-9 include the route and the number of routes. On the other hand, the substitute route number tables Tcx and Tdx include a sending source node tr of the data packet and a number of substitute routes, sn. In the example illustrated in FIG. 12, the sending destination node of each data packet is the gateway GW.

First, a description will be given of the number of substitute routes, sn, of the relaying node c, in the routes from the sending source node a (tr) to the sending destination gateway GW. In this case, the number of substitute routes, sn, can be computed to be 1 (=3−2×1), based on a formula [{total number of routes (=3) from sending source node a to sending destination gateway GW}−{number of routes (=2) between node c and sending source node a}×{number of routes (=1) between node c and sending destination gateway GW}]. In this case, the substitute route is "node a→node b→node d→gateway GW". In addition, the number of substitute route, sn, of the node c in the routes from the sending source node c (tr) to the sending destination gateway GW, is 0 because the node c is the sending source node.

Similarly, a description will be given of the number of substitute routes, sn, of the relaying node d in the routes from the sending source node b (tr) to the sending destination gateway GW. In this case, the number of substitute routes, sn, can be computed to be 2 (=3−1×1), based on a formula [{total number of routes (=3) from sending source node b to sending destination gateway GW}−{number of routes (=1) between node b and sending source node a}×{number of routes (=1) between node d and sending destination gateway GW}]. In this case, the substitute route is "node b→node c→gateway GW" or "node b→node a→node c→gateway GW".

Accordingly, the number of substitute routes of the relaying node 5 can be computed based on the total number of routes between the sending source node 5 and the sending destination node 5, the number of routes between the relaying node 5 and the sending source node 5, and the number of routes from the relaying node 5 to the sending destination node 5. The number of routes can be generated efficiently based on the Hello packet, which is an example of the existing control packet. Hence, the node 5 can quickly and efficiently compute the number of substitute routes while relaying via other nodes 5, without applying load on the network.

As described above in conjunction with FIG. 8, the routes that are detected may be restricted based on the number of hops of the route, for example. In this case, by excluding the inefficient routes, it is possible to avoid the computation error when computing the number of substitute routes. For example, the total number of routes from the sending source node 5 to the sending destination node 5 includes the number of inefficient routes, and the computed number of substitute routes may include an error in a case in which the number of routes relaying the node 5 includes the number of inefficient routes. For this reason, in order to improve the accuracy of the number of substitute routes, the routes may be restricted to the routes that are within a predetermined number of hops from the route having the minimum number of hops.

Accordingly, the routing information in this embodiment includes routes within a reference distance range (for example, within 2 hops) from a minimum distance of each route. The node 5 may compute the number of substitute routes from the routing information, based on the total number of routes from the sending source node 5 to the sending destination node 5 and the number routes relaying the node 5. In this case, the number of substitute routes can be computed with a high accuracy, by excluding the inefficient routes from the total number of routes from the sending source node 5 to the sending destination node 5, and from the number of routes relaying the node 5.

Next, a more detailed description will be given of the process of each node 5.

Figure 13:
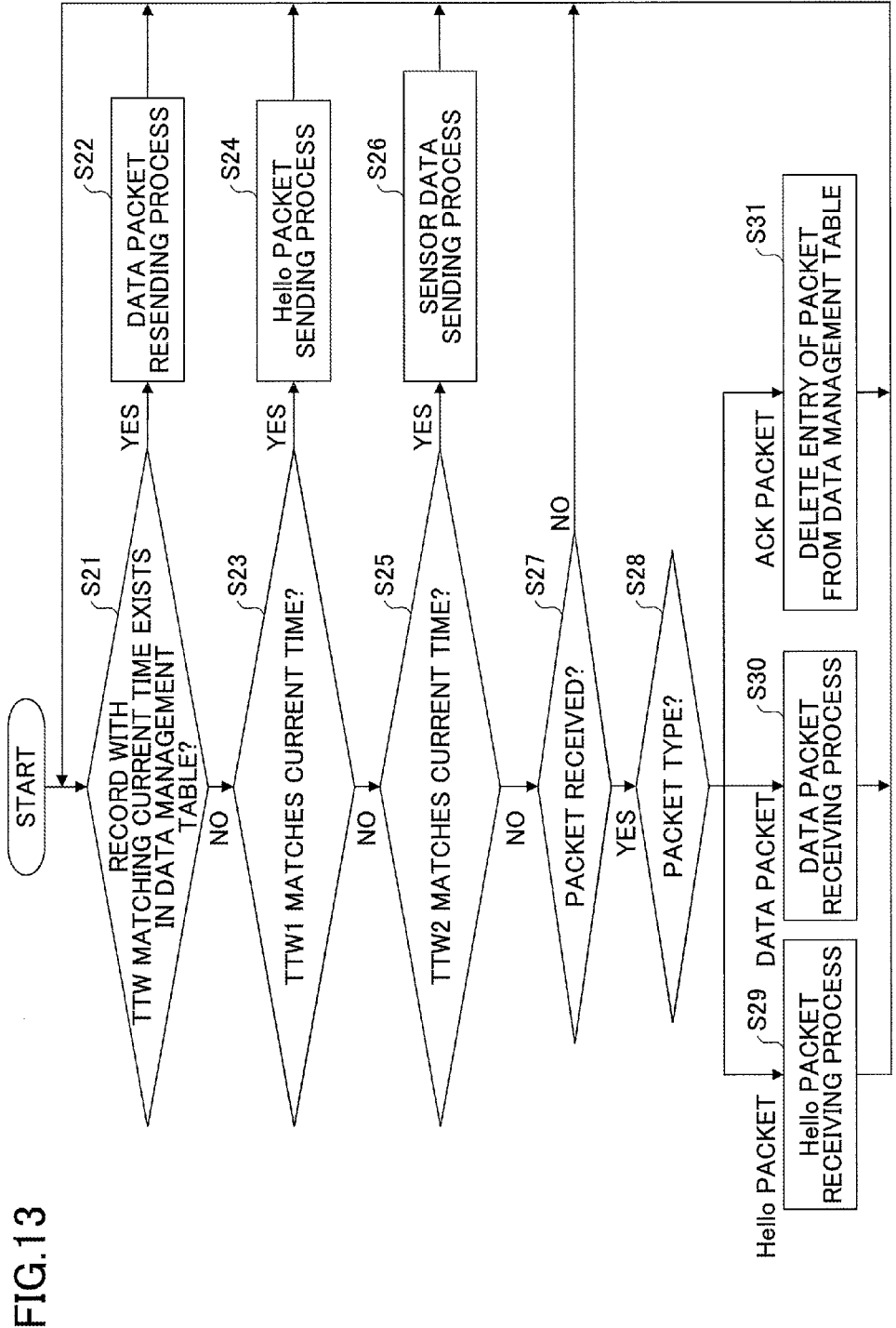
FIG. 13 is a flow chart for explaining an example of a process performed at the node.

FIG. 13 is a flow chart for explaining an example of the process performed at the node. Each node 5 may correspond to the sending node 5 and the relaying node 5. The sending node 5 refers to a node that becomes a data sending source. The relaying node 5 refers to a node that relays data received from one node 5 to another node 5. The sending node 5 includes the sending source node, and the relaying node 5 includes the sending source node 5 and the sending destination node 5. The sending source node 5 refers to a relaying node on the side that sends the data to another node 5. On the other hand, the sending destination node 5 refers to a node on the side that receives the data from another node 5. In addition, a target node 5 refers to a node that becomes a final destination of the data sent from the sending node 5 at the data sending source.

In step S21 illustrated in FIG. 13, the node 5 judges whether a record with a time TTW matching a current time exists in a data management table Tm that manages the packet data. The data management table Tm is included in the various tables 22. After sending the data packet, the node 5 registers an entry, corresponding to the data packet that is sent, in the data management table Tm. When the node 5 receives an acknowledge (hereinafter also referred to as "ACK") corresponding to the data packet that is sent from the node 5 from the sending destination node 5, the node 5 deletes the entry of the corresponding data packet from the data management table Tm.

The time TTW is a time that is set in the data management table Tm, in correspondence with the data packet. This time TTW is set to a time after an ACK waiting time elapses from a sending time when the data packet is sent, where the ACK waiting time is a time during which the receipt of the ACK is waited at the node 5. In a case in which the record with the time TTW matching the current time exists in the data management table Tm and the judgment result in step S21 is YES, it indicates that the ACK has not been returned after sending of the data packet, even after the ACK waiting time elapses. In other words, this case indicates that the data packet that is sent from the node 5 has not been received by the sending destination node 5.

Hence, when the judgment result in step S21 is YES, the node 5 in step S22 performs a sending process or a resending process to send the data packet. The sending process and the resending process will be described later in conjunction with flow charts. The node 5 in step S21 and S22 can perform the process to resend the data packet, in the case in which the ACK is not returned within a predetermined time after sending the data packet.

On the other hand, in a case in which the record with the time TTW matching the current time does not exist in the data management table Tm and the judgment result in step S21 is NO, the node 5 in step S23 judges whether a time TTW1 matches the current time. The time TTW1 is a time that is set after sending the Hello packet, and indicates the time after a time corresponding to a sending period of the Hello packets elapses. The Hello packets are periodically broadcast. In other words, the time TTW1 indicates a sending time of the next Hello packet. For this reason, in the case in which the time TTW1 matches the current time and the judgment result in step S23 is YES, it indicates arrival of the sending time of the Hello packet. Accordingly, the node 5 in step S24 performs a sending process to send the Hello packet. In this embodiment, the node 5 sends the Hello packet including the routing data. The Hello packet sending process will be described later in conjunction with a flow chart. The node 5 in steps S23 and S24 can perform a process to periodically broadcast the Hello packets.

In a case in which the time TTW1 does not match the current time and the judgment result in step S23 is NO, the node 5 in step S25 judges whether a time TTW2 matches the current time. The time TTW2 is a time that is set after sending the data packet, and indicates the time after a time corresponding to a sending period of the data packets elapses. The data packets are periodically broadcast. In other words, the time TTW2 indicates a sending time of the next data packet. For this reason, in the case in which the time TTW2 matches the current time and the judgment result in step S25 is YES, it indicates arrival of the sending time of the data packet. Accordingly, the node 5 in step S26 performs a sending process to send the sensor data (that is, data packet). The node 5 in this embodiment sends the data packet including the total number of routes from the node 5 that forms the sending source node to the target node 5. The node 5 in steps S25 and S26 can perform a process to periodically broadcast the sensor data (that is, data packets).

On the other hand, in a case in which the time TTW2 does not match the current time and the judgment result in step S25 is NO, the node 5 in step S27 judges whether a packet is received by the node 5. In a case in which the node 5 receives the packet and the judgment result in step S27 is YES, the node 5 in step S28 judges a type (or packet type) of the received packet. On the other hand, in a case in which the packet is not received by the node 5 and the judgment result in step S27 is NO, the process of the node 5 returns to step S21.

In the case in which the node 5 receives the packet and the judgment result in step S27 is YES, the node 5 performs one of steps S28, S30, and S31 depending on the type of the received packet judged in step S28. In a case in which the received packet is the Hello packet, the node 5 in step S29 performs a Hello packet receiving process. On the other hand, in a case in which the received packet is the data packet, the node 5 in step S30 performs a data packet receiving process. The Hello packet receiving process of step S29 and the data packet receiving process of step S30 will be described later in conjunction with flow charts. In a case in which the received packet is the ACK packet, the node 5 in step S31 deletes the entry of the data packet corresponding to the ACK from the data management table Tm. Accordingly, it is possible to confirm reception of the data packet that is sent.

Figure 14:
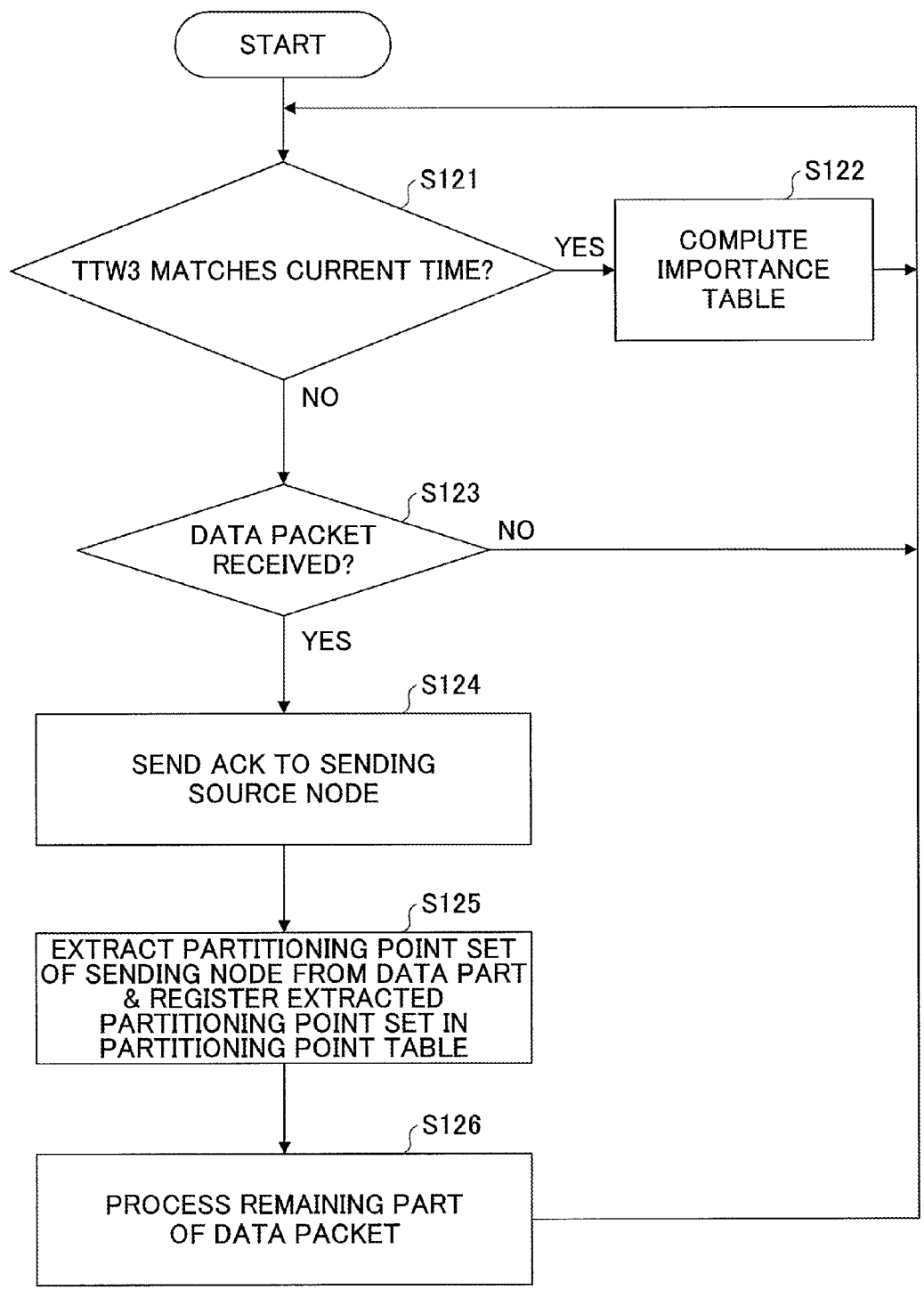
FIG. 14 is a flow chart for explaining an example of a process performed at a gateway.

FIG. 14 is a flow chart for explaining an example of a process performed at the gateway. In this example, the gateway GW is an example of the target node. In step S121 illustrated in FIG. 14, the gateway GW judges whether a time TTW3 matches the current time. The time TTW3 is a time that is set after computing (or generating) the importance of the node, and indicates the time after a time corresponding to a computing (or generating) period of the importance at the current time. In the case in which the time TTW3 matches the current time and the judgment result in step S121 is YES, the gateway GW in step S122 forms an importance table, and the process returns to step S121. The importance table stores the importance for each sending source node 5, and it is possible to assign a priority order to failures when coping with the failures of a plurality of nodes 5. In a case in which the gateway GW has the same configuration as the node 5, the importance table is included in the various tables 22 illustrated in FIG. 2.

On the other hand, in a case in which the time TTW3 does not match the current time and the judgment result in step S121 is NO, the gateway GW in step S123 judges whether a packet is received by the gateway GW. In a case in which the packet is not received by the gateway GW and the judgment result in step S123 is NO, the process returns to step S121. On the other hand, in a case in which the gateway GW receives the packet and the judgment result in step S123 is YES, the gateway GW in step S124 sends the ACK to the sending source node 5. In step S125, the gateway GW extracts a partitioning point set of the sending node 5 from the data part of the received data packet, and registers the extracted partitioning point set in a partitioning point set table. As will be described later, the partitioning point set is a set of nodes 5 partitioning the routes from the sending node 5 to the target node 5 at partitioning points. In addition, as will be described later, the partitioning point set table includes the sending node 5, and the partitioning point set with respect to the sending node 5. In step S126, the gateway GW processes a remaining part of the received data packet, and the process returns to step S121.

Next, a description will be given of the partitioning point set. Even in the case in which a large number of routes exist between the sending node and the target node, there is a high possibility that the routes will become partitioned if a large number of nodes are common to different routes. In addition, as the route becomes longer, the possibility that the routes will become partitioned becomes higher. Accordingly, in a case in which failures are generated in a plurality of nodes, it is judged that a node having a highest partitioning probability is an important node.

Figure 15:
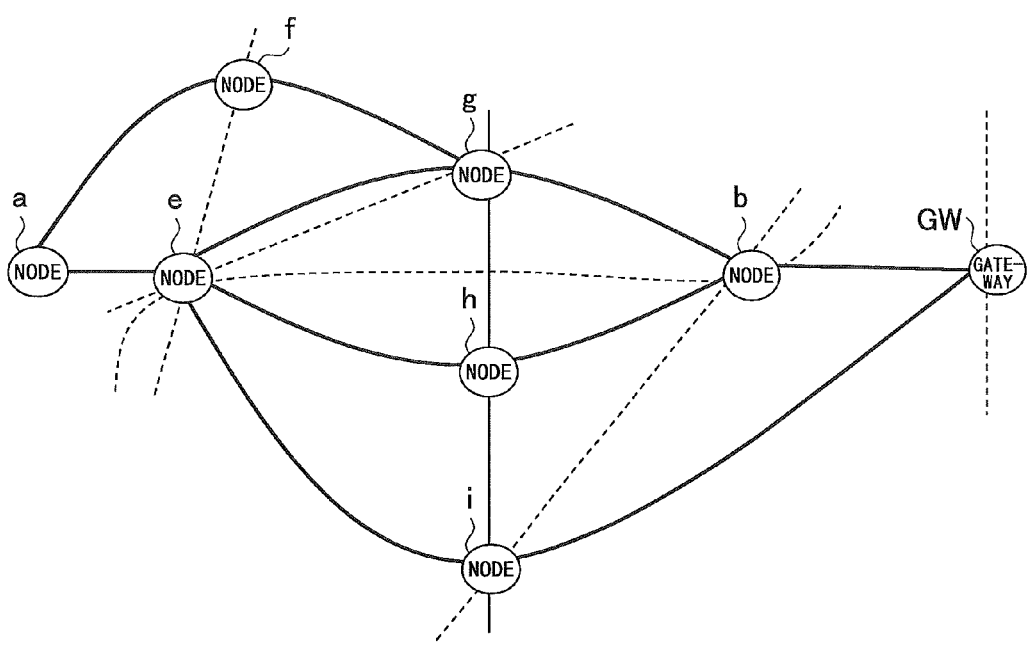
FIG. 15 is a diagram illustrating an example of the ad hoc network system.

FIG. 15 is a diagram illustrating an example of the ad hoc network system. For example, in the ad hoc network system 1 illustrated in FIG. 15, partitioning points of the routes, that is, sets of the nodes partitioning the routes, are checked first. In the example illustrated in FIG. 15, it is assumed for the sake of convenience that the node a is the sending node (that is, origin point of route), and the gateway GW is the target node (that is, target point). In addition, the partitioning points are indicated by dotted lines.

Next, the partitioning point set for the case in which the failure is generated in one node of interest, is checked with respect to each of the nodes on the routes. In other words, elements remaining after excluding the one node of interest from each of the partitioning points are changed into partitioning points. For example, a partitioning point b-i→b is changed to a partitioning point b-e→e. In addition, identical partitioning points and partitioning points in higher layers (or levels) are excluded. For example in a case where the partitioning point i-e and the partitioning point e exist, the partitioning point i-e is excluded.

The partitioning probability of the partitioning points that are obtained can be computed using a node failure probability P, for example. FIG. 16 is a diagram illustrating an example of the sending source node tr, a number of nodes, N=1 to 3, forming the partitioning point, an approximation value of the partitioning probability, and the number of substitute routes in the ad hoc network system 1 illustrated in FIG. 15.

In this example, a description will be given of a computation method to compute the number of substitute routes of the relaying node f, in the routes from the sending node a to the gateway GW that forms the target node. The number of substitute routes can be computed from the formula [(total number of routes from sending node to target node)−(number of routes relaying nodes)]. The number of routes relaying the nodes is represented by [(number of routes between node and sending node)×(number of routes between node and target node)]. In the example illustrated in FIG. 15, the number of routes between the sending node a and the gateway GW that forms the target node is 4. In addition, the number of routes between the sending node a and the relaying node b is 3, and the number of routes between the relaying node b and the gateway GW is 1. Accordingly, the product (=3×1) of the number of routes between the sending node a and the relaying node b, that is 3, and the number of routes between the relaying node b and the gateway GW, that is 1, is subtracted from the total number of routes between the sending node a and the gateway GW, that is 4. Hence, it is possible to compute the number of substitute routes, that is 1 (=4−3×1), of the relaying node b in the routes from the sending node a to the gateway GW.

The number of substitute routes of the relaying node b is computed in this example. However, the number of substitute routes of other relaying nodes may be computed in a similar manner. In addition, the number of substitute routes of one relaying node differs depending on the sending node and the target node of the data packet.

FIG. 16 illustrates a change in the partitioning points with respect to traffic from the sending node a, for a case in which each node independently fails. In this example, the sending node a includes partitioning points e-f, e-g, b-i, and b-e for the number of nodes, N=2, forming the partitioning points, and includes a partitioning point g-h-i for the number of nodes, N=3, forming the partitioning points. As illustrated in FIG. 16, the node b, for example, includes partitioning points i and e (i, e) for the number of nodes, N=1, forming the partitioning points, the approximation value of the partitioning probability is 2*P, and the number of substitute routes is 1. In addition, the node f, for example, includes the partitioning point e for the number of nodes, N=1, forming the partitioning points, includes a partitioning point b-i for the number of nodes, N=2, forming the partitioning point, includes a partitioning point g-h-i for the number of nodes, N=3, forming the partitioning point, the approximation value of the partitioning probability is P+P2+P3, and the number of substitute routes is 3. A symbol "*" represents a multiplication, and a symbol "**" represents an exponential (or power). Hence, the partitioning probability can more accurately evaluate the effects of the failure of the node, when compared to the number of substitute routes indicated as a comparison example in FIG. 16. In other words, the partitioning probability can more accurately represent the importance of the node than the number of substitute routes.

Accordingly, in a case in which an evaluation value of the route is computed from the importance of each node 5 for each of the multiplexed nodes 5 in the ad hoc network system 1 including a large number of nodes 5, it is possible to assign the priority order to the node 5 that becomes the maintenance target based on the evaluation value, and narrow down the nodes 5 that are maintenance targets.

Next, a description will be given of the data packet sending process executed by step S22 illustrated in FIG. 13, the Hello packet sending process executed by step S24 illustrated in FIG. 13, the Hello packet receiving process executed by step S29 illustrated in FIG. 13, the data packet sending process executed by step S30 illustrated in FIG. 13, and the data packet resending process executed by step S22 illustrated in FIG. 13.

Figure 17:
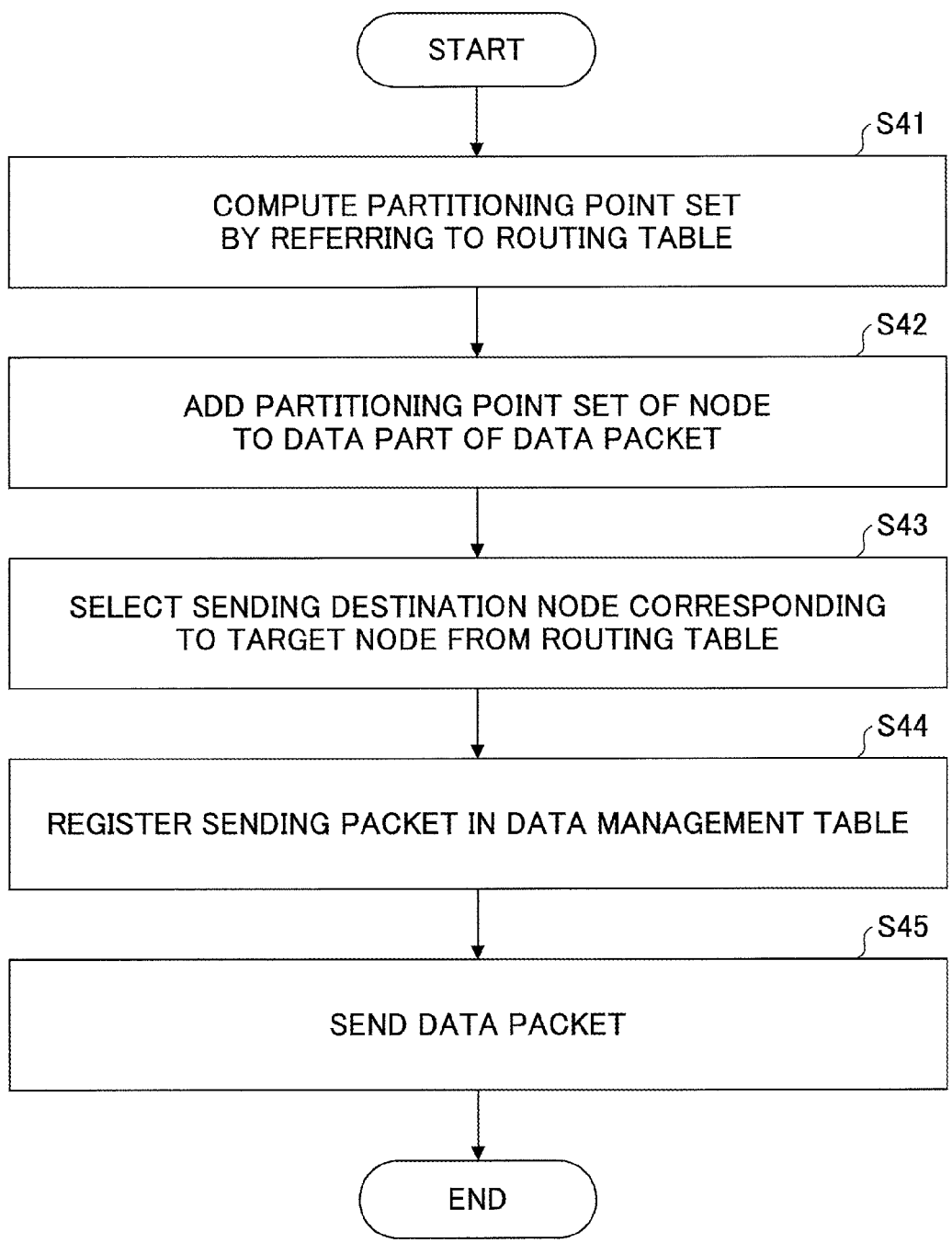
FIG. 17 is a flow chart for explaining an example of a sending process to send data packets at the node.

FIG. 17 is a flow chart for explaining an example of the data packet sending process to send data packets at the node. The data packet sending process illustrated in FIG. 17 is executed by step S22 illustrated in FIG. 13. In step S41 illustrated in FIG. 17, the route selector 42 of the node 5 refers to the routing table Tt, and computes the partitioning point set of the node 5. In step S42, the data packet generator 41 and the route selector 42 adds to the data part of the data packet, the partitioning point set computed in step S41, in addition to the sensor data. In step S43, the route selector 42 refers to the routing table Tt, and selects information of the next sending destination node 5, indicated by the delaying node in the route to the target node 5. In step S44, the data packet transmitter 43 registers information of the data packet to be sent, in the data management table Tm. In step S45, the data packet transmitter 43 sends the data packet, and the data packet sending process ends.

Figure 18:
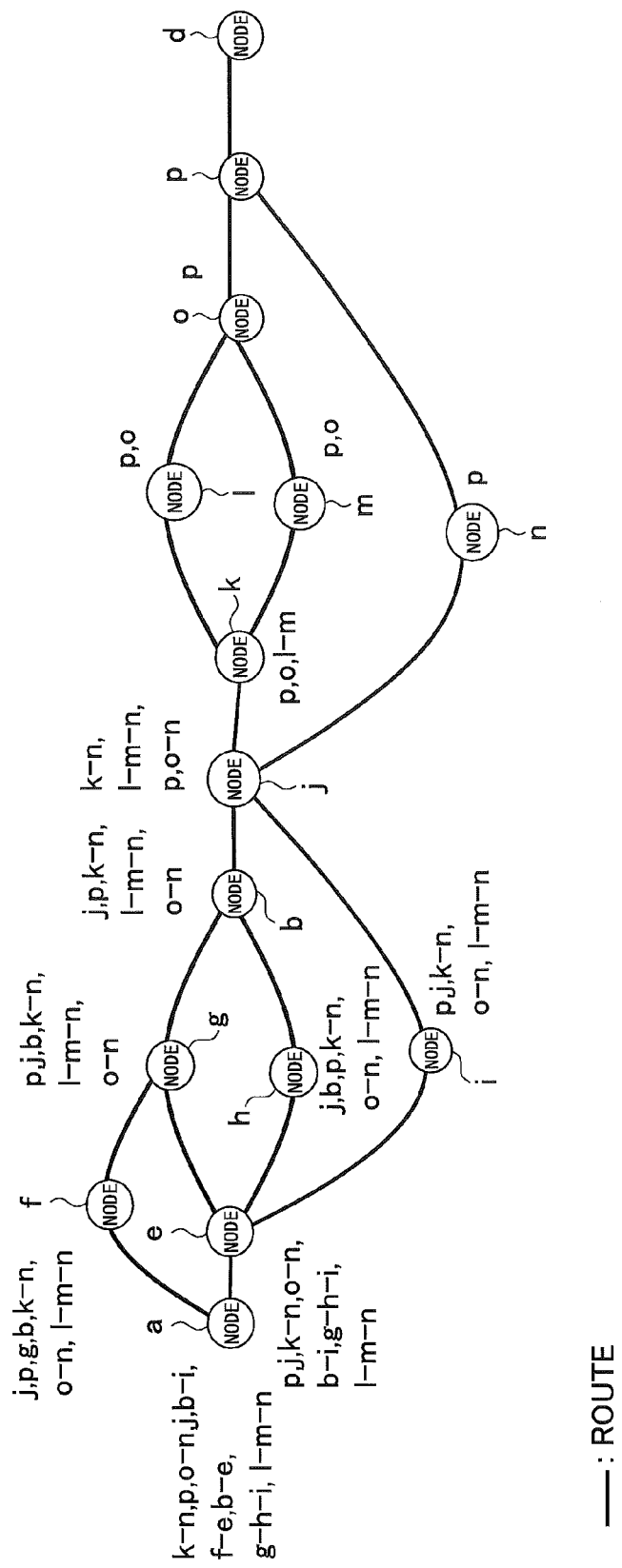
FIG. 18 is a diagram illustrating a first example of a method of computing a partitioning point set.

FIG. 18 is a diagram illustrating a first example of a method of computing a partitioning point set. In this first example, a computation result with respect to a nearby node is reused, in order to more efficiently compute the partitioning points when compared to a case in which the partitioning points are independently computed with respect to all of the nodes in the ad hoc network system 1. First, information of the partitioning point set is stored at each sending source node. In FIG. 18, the information of the partitioning point set stored by each node is illustrated beside each node. In this example, it is assumed for the sake of convenience that the node a is the sending node, and the node d is the target node. The target node may be the gateway GW.

In a case in which the number of relaying nodes from one node to the target node is 1, the partitioning point consisting solely of the relaying node is added to the partitioning point set of the relaying node, and is regarded as the partitioning point set of the one node. Accordingly, in the case of the partitioning point set of the node l, for example, the relaying node consists solely of the node o, and the partitioning point set of the relaying node o is p. This partitioning point set p is added to the relaying node o to obtain (p, o) that is computed as the partitioning point set of the node l. In the case of the partitioning point set of the node p, there is no partitioning point because the node p is not directly communicable with the target node d.

On the other hand, in a case in which the number of relaying nodes from one node to the target node is 2 or more, each relaying node itself is added to the partitioning point set thereof. In addition, elements are selected one by one from the partitioning point set of each relaying node, and a partitioning point set that excludes overlaps from a Cartesian product is regarded as the partitioning point set of the one node. Accordingly, in the case of the partitioning point set of the node k, for example, there are 2 relaying nodes l and m, and the partitioning point sets of the relaying nodes l and m are (p, o) and the same. The partitioning point set (p, o) is added to each of the relaying nodes l and m, to compute 2 partitioning point sets (p, o, l) and (p, o, m). In addition, a partitioning point set (p, o, l-m) is computed, by excluding the overlapping elements from the Cartesian product of the 2 partitioning point sets (p, o, l) and (p, o, m). Similarly, in the case of the partitioning point set of the node j, for example, there are 2 relaying nodes k and n, and the partitioning point set of the relaying node k is (p, o, l-m), while the partitioning point set of the relaying node n is p. The partitioning point set (p, o, l-m) is added to the relaying node k, and the partitioning point set p is added to the relaying node n, to compute 2 partitioning point sets (p, o, l-m, k), and (p, n). In addition, a partitioning point set (k-n, l-m-n, p, o-n) is computed, by excluding overlapping elements from the Cartesian product of the 2 partitioning point sets (p, o, l-m, k), and (p, n).

Figure 19:
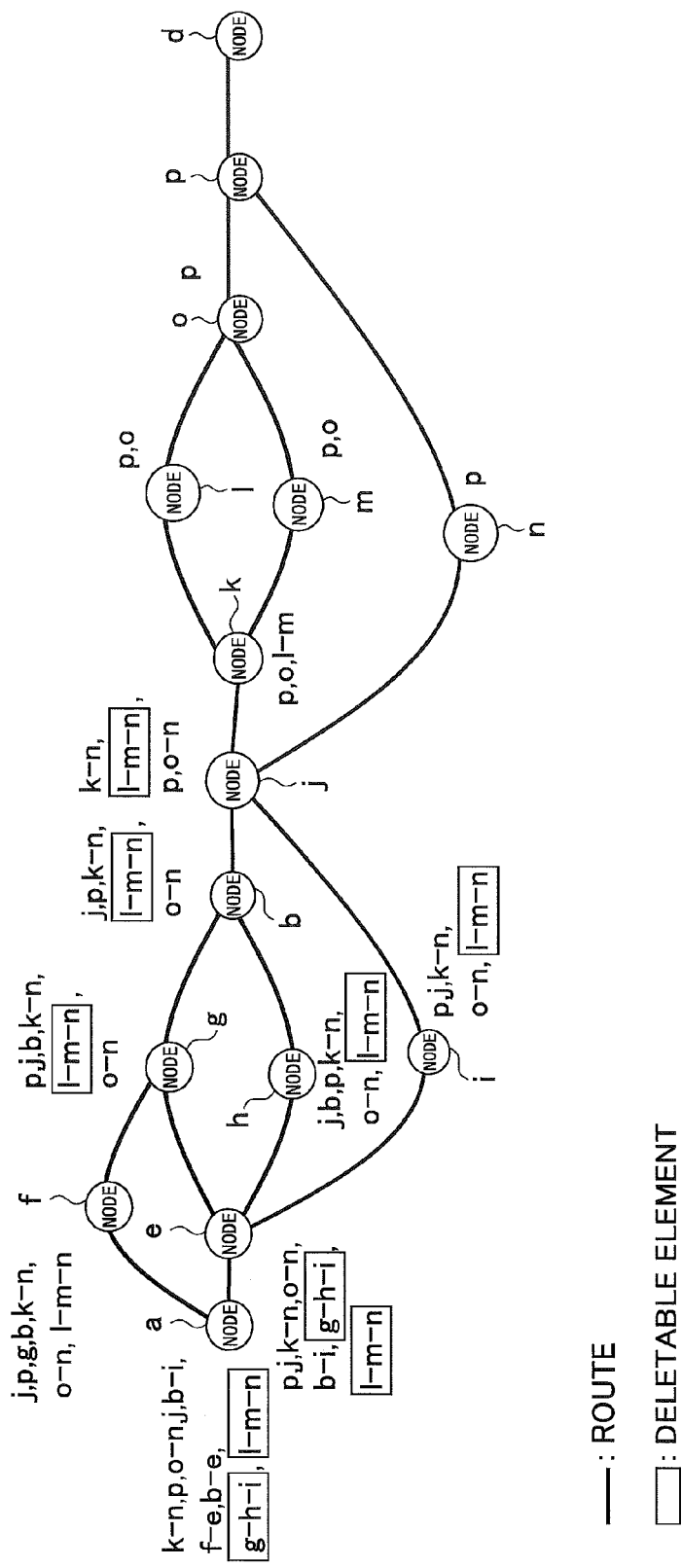
FIG. 19 is a diagram illustrating a second example of the method of computing the partitioning point set.

FIG. 19 is a diagram illustrating a second example of the method of computing the partitioning point set. In FIG. 19, those parts that are the same as those corresponding parts in FIG. 18 are designated by the same reference numerals, and a description thereof will be omitted. In general, as the multiplicity of the routes increases, the number of branches also increases, to thereby considerably increase the amount of computation to compute the Cartesian product of the sets. Hence, this second example notes that the partitioning point having a large number of elements require a large amount of computation but the contribution to the importance of the node is relatively small, and that the partitioning point having a small number of elements, that is, a small number of routes, contribute greatly to the importance of the node.

In other words, this second example checks the number of elements of the partitioning point, and deletes from the partitioning point set of the node the partitioning point having a large number of elements, in order to reduce the amount of computation without deteriorating the accuracy of judging the importance. In FIG. 19, the elements that can be deleted are surrounded by a rectangle, for a case in which an upper limit of the number of elements of the partitioning point is 2. In FIG. 19, an element l-m-n is deleted from a partitioning point set k-n, l-m-n, p, o-n of the node j, for example. In addition, an element g-h-i, l-m-n is deleted from a partitioning point set p, j, k-n, o-n, b-i, g-h-i, l-m-n of the node e, for example.

Figure 20:
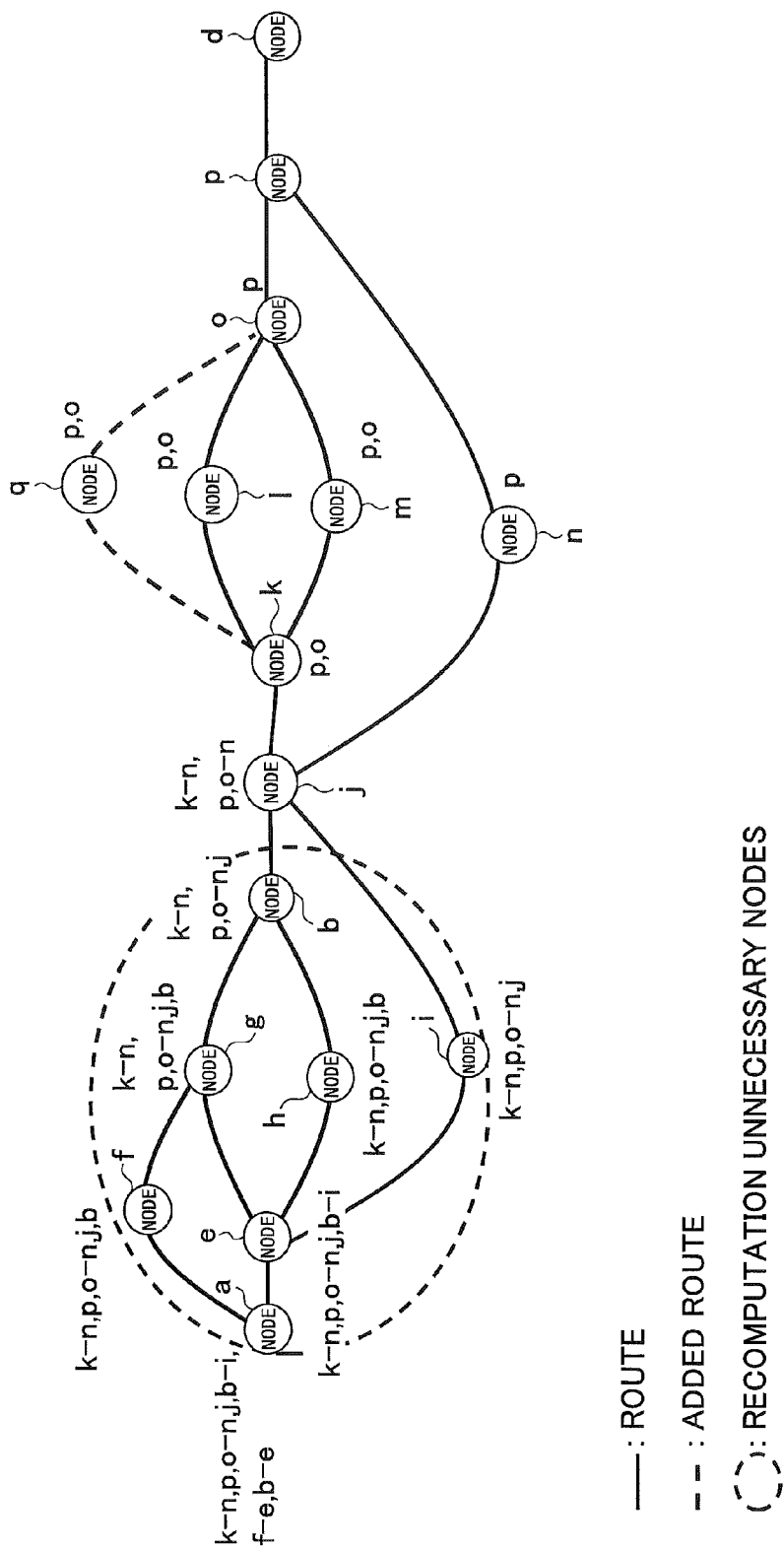
FIG. 20 is a diagram illustrating a third example of the method of computing the partitioning point set.

FIG. 20 is a diagram illustrating a third example of the method of computing the partitioning point set. In FIG. 20, those parts that are the same as those corresponding parts in FIG. 18 are designated by the same reference numerals, and a description thereof will be omitted. For example, a sensor network system includes a mechanism to change routes according to situation or environment, and the routes are constantly subjected to a partial modification. However, even in a case in which a route change occurs locally within the sensor network system, this local route change may affect routes beyond the location of the local route. For his reason, when the route change occurs, the partitioning point set needs to be recomputed for all of the nodes (for example, sensor network apparatuses) within the sensor network system.

Hence, this third example provide an upper limit to the number of elements in the partitioning point, and deletes the partitioning points having a number of elements exceeding the upper limit. In addition, a notification requiring recomputation of the partitioning point set is made to the nodes beyond the route where the change occurs, only in a case in which the partitioning point set of one node changes due to the recomputation. FIG. 20 illustrates a case in which a new node q is added between the node k and the node o. In this example, the node j has a route to the node n, and there originally is no partitioning point that includes l-m. For this reason, even when the node q is added, no change occurs in the partitioning point set of the node j, and the notification requiring the recomputation is unnecessary with respect to the nodes a, b, e, f, g, h, and i surrounded by a dotted line in FIG. 20 and located before the node j. In addition, the notification requiring the recomputation is unnecessary with respect to the nodes m, n, o, and p beyond the node j. On the other hand, with respect to the node k, the multiplicity of the relaying routes changes from 2 to 3 due to the addition of the node q, and thus, the element l-m is deleted from the partitioning point set of the node k.

Figure 21:
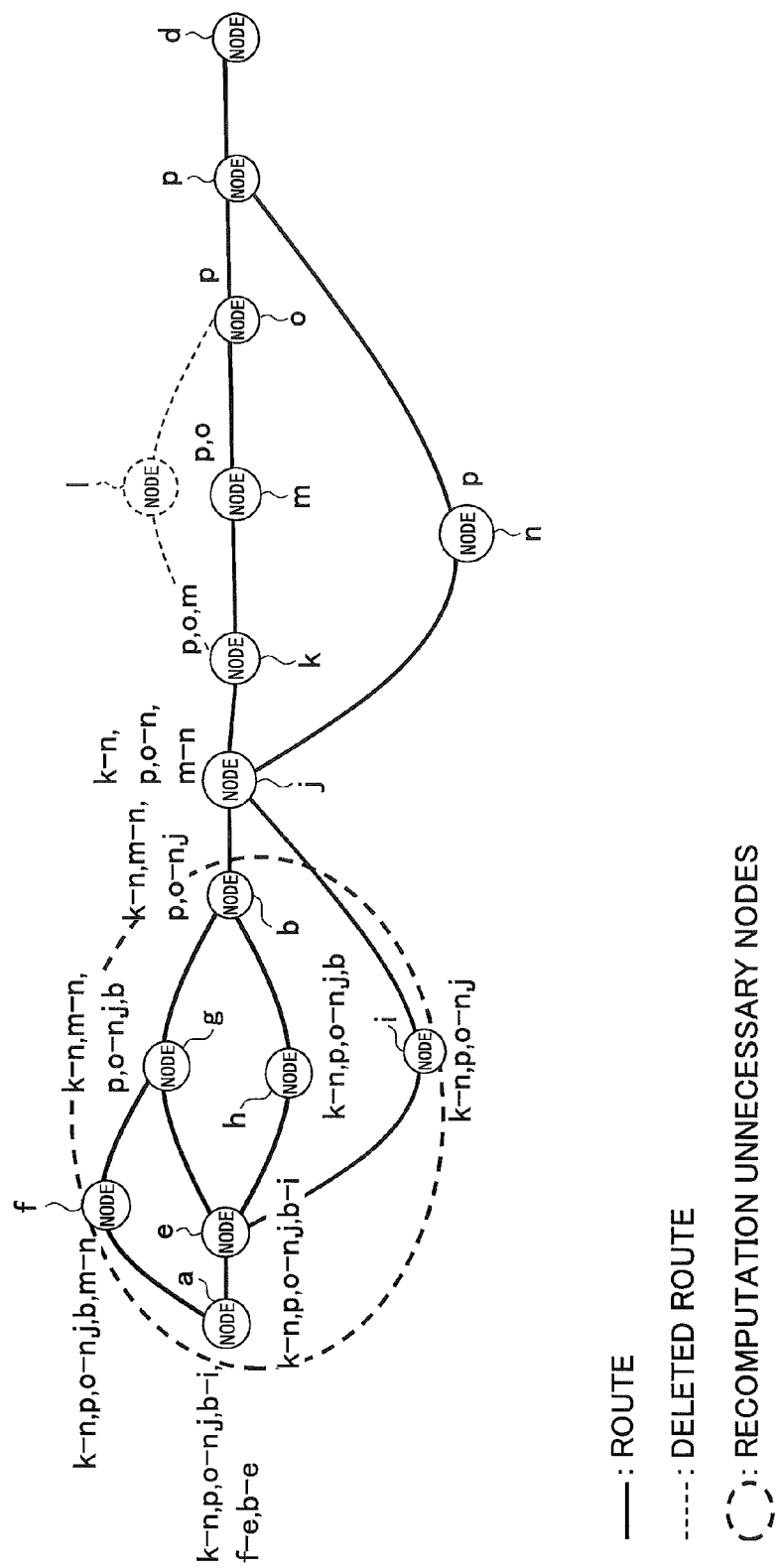
FIG. 21 is a diagram for explaining a first example of a route change.

FIG. 21 is a diagram for explaining a first example of a route change. In FIG. 21, those parts that are the same as those corresponding parts in FIG. 19 are designated by the same reference numerals, and a description thereof will be omitted. FIG. 21 illustrates a case in which the node 1 is deleted (or removed). In this example, the node j has a route to the node n, and there originally is no partitioning point that includes l-m. For this reason, even when the node l is deleted, and the notification requiring the recomputation is unnecessary with respect to the nodes a, b, e, f, g, h, and i surrounded by a dotted line in FIG. 21 and located before the node j. In addition, the notification requiring the recomputation is unnecessary with respect to the nodes m, n, o, and p beyond the node j. On the other hand, with respect to the node j, the elements of the partitioning point set change to k-n, p, o-n, and m-n by the deletion of the node l. Further, with respect to the node k, the elements of the partitioning point set change to p, o, and m.

Figure 22:
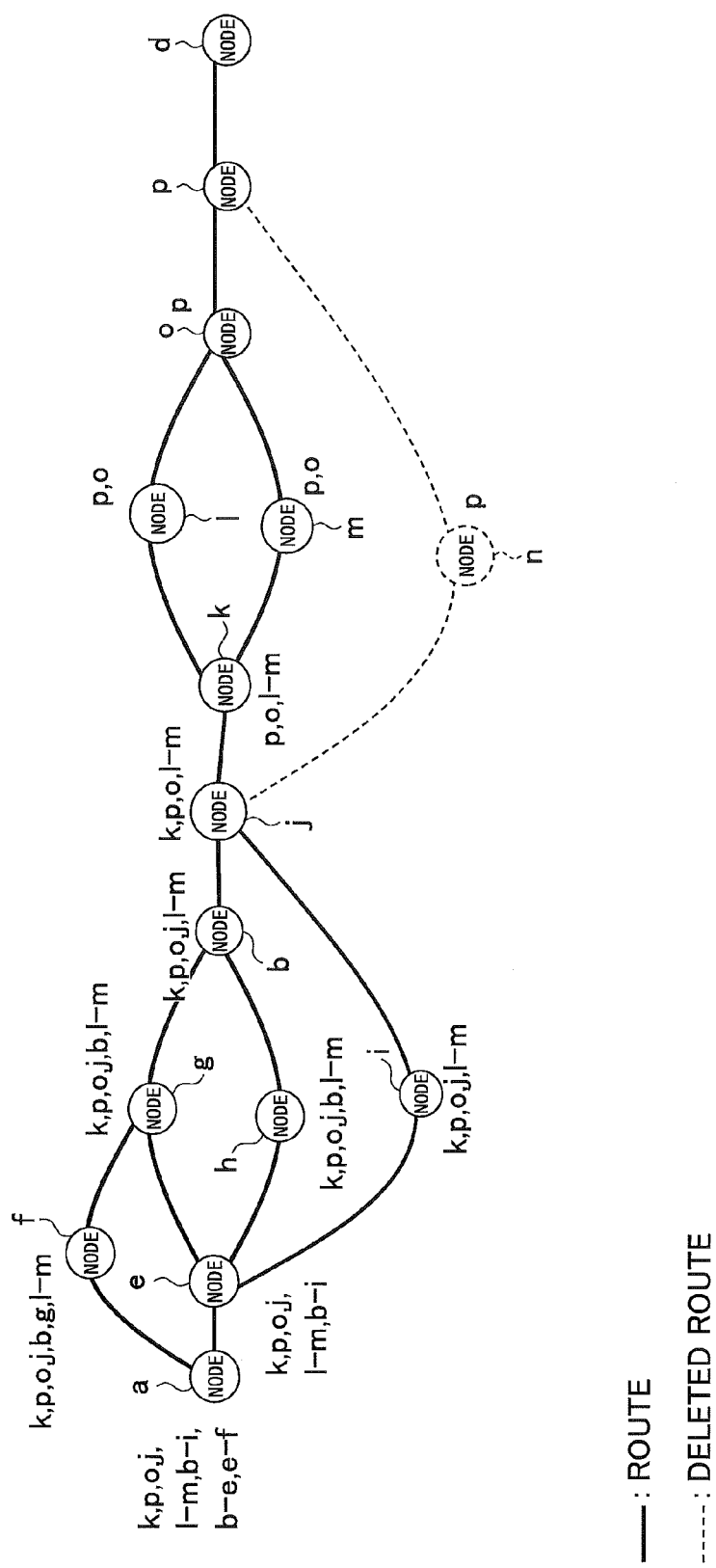
FIG. 22 is a diagram for explaining a second example of a route change.

FIG. 22 is a diagram for explaining a second example of a route change. In FIG. 22, those parts that are the same as those corresponding parts in FIG. 18 are designated by the same reference numerals, and a description thereof will be omitted. FIG. 22 illustrates a case in which the node n is deleted (or removed). In this example, with respect to the node j, elements k, o, l-m or the like appear in the partitioning point set due to the deletion of the node n. For this reason, the notification requiring the recomputation is necessary with respect to the nodes a, b, e, f, g, h, and i before the node j, and the notification requiring the recomputation is also necessary with respect to the node k beyond the node j. On the other hand, the notification requiring the recomputation is unnecessary with respect to the nodes l, m, o, and p.

Figures 23A, 23B:
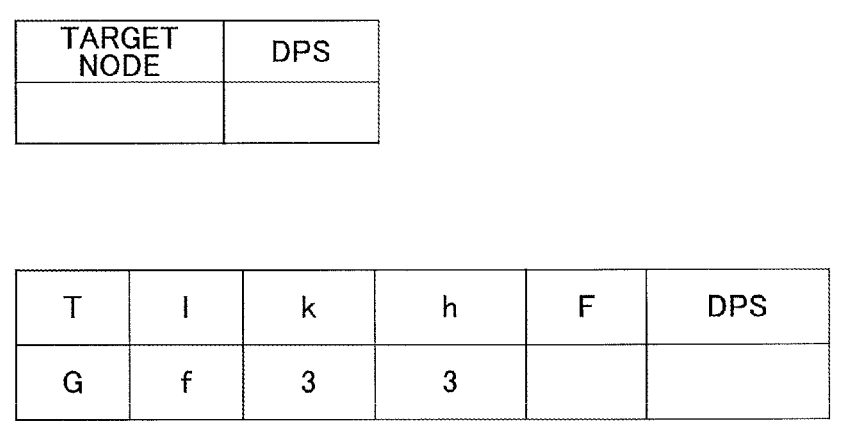

FIGS. 23A and 23B are diagrams illustrating an example of the partitioning point set and the routing table at the node. As illustrated in FIG. 23A, a partitioning point set DPS is stored in the memory 12 together with the target node. In addition, as illustrated in FIG. 23B, the routing table Tt stores the sending destination node T, the adjacent node 1, the number of hops, h, to the sending destination node T, the number of routes, k, between one node and the sending destination node T, a change flag F, and the partitioning point set DPS. The change flag F indicates a route change by an on state thereof, and a default state of the change flag F is the on state, for example.

Figure 24:
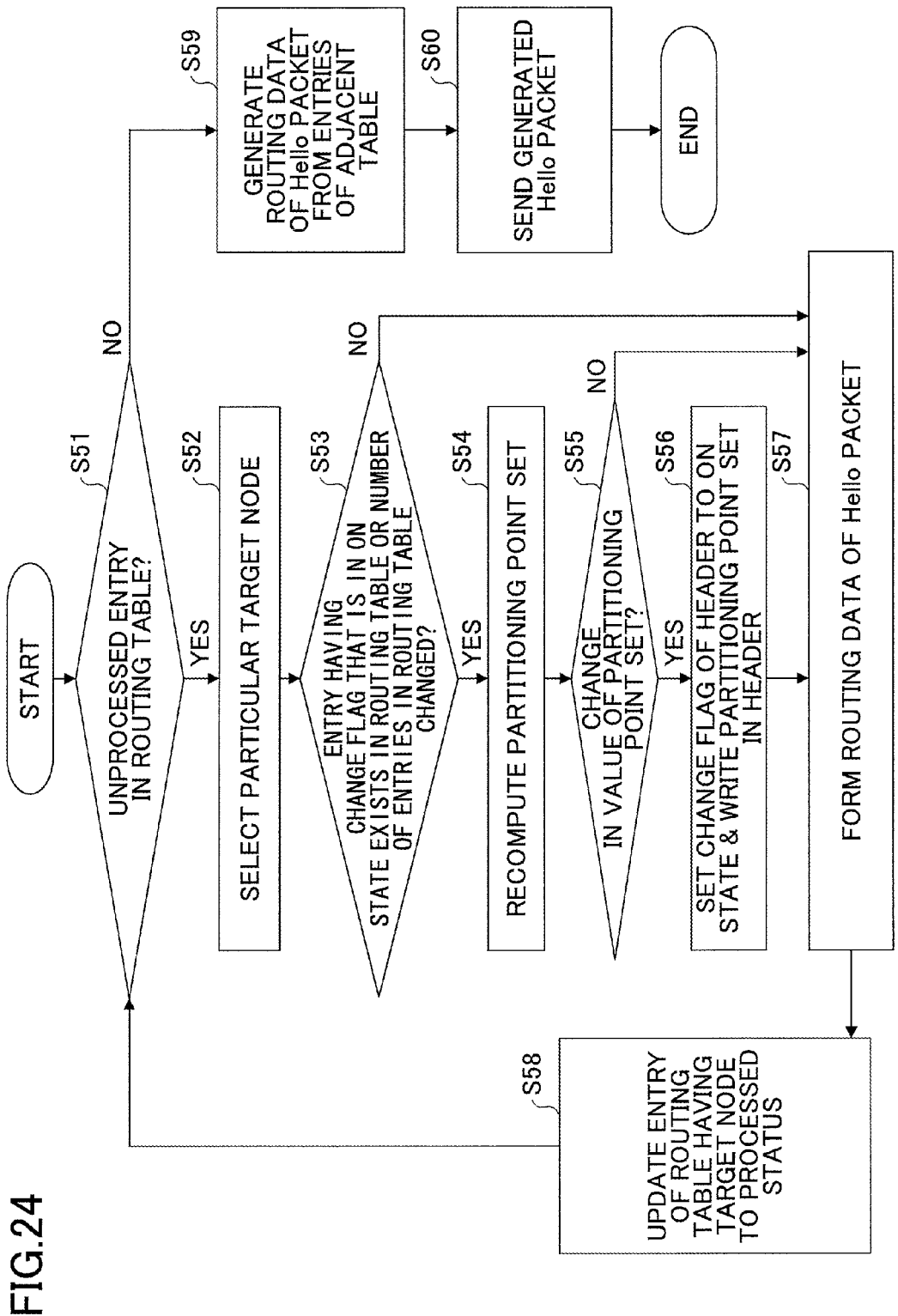
FIG. 24 is a flow chart for explaining an example of a sending process to send Hello packets at the node.

FIG. 24 is a flow chart for explaining an example of the sending process to send the Hello packets at the node. The Hello packet sending process illustrated in FIG. 24 is executed by step S24 illustrated in FIG. 13. In step S51 illustrated in FIG. 24, the Hello packet generator 34 of the node 5 refers to the routing table Tt and judges whether an unprocessed entry exists in the routing table Tt. In a case in which the unprocessed entry exists in the routing table Tt and the judgment result in step S51 is YES, the Hello packet generator 34, in step S52, selects a particular target node from the unprocessed entries in the routing table Tr. In the sensor network system, for example, there usually is only 1 target node, which is the gateway GW.

In step S53, the Hello packet generator 34 judges whether an entry having the change flag F that is in the on state exists in the routing table Tt, or whether the number of entries in the routing table Tt changed. In a case in which the routing table Tt includes no entry having the change flag F that is in the on state, or the number of entries in the routing table Tt remains unchanged, and the judgment result in step S53 is no, the process advances to step S57 that will be described later. On the other hand, in a case in which the routing table Tt includes an entry having the change flag F that is in the on state, or the number of entries in the routing table Tt changed, and the judgment result in step S53 is YES, the process advances to step S54. In step S54, the Hello packet generator 34 recomputes the partitioning point set. In step S55, the Hello packet generator 34 judges whether there is a change in the value of the partitioning point set. In a case in which the value of the partitioning point set remains unchanged and the judgment result in step S55 is NO, the process advances to step S57 that will be described later.

On the other hand, in a case in which the value of the partitioning point set changed, and the judgment result in step S55 is YES, the process advances to step S56. In step S56, the Hello packet generator 34 sets the change flag F of a Hello header to the on state, and writes the partitioning point set DPS in the Hello header, and the process advances to step S57. FIG. 25 is a diagram illustrating an example of the Hello header. The Hello header illustrated in FIG. 25 includes the target node, the number of hops, h, to the target node, a route quality weight, a round-trip link weight, the change flag F, and the partitioning point set DPS. The route quality weight is set to a weighting value, if necessary, in a case in which the weighting of the route quality is performed. The round-trip weight is set to a weighting value, if necessary, in a case in which the weighting of the round-trip is performed.

In step S57, the Hello packet generator 34 forms routing data to be added to the Hello packet. More particularly, the Hello packet generator 34 forms the routing data to be added to the Hello packet. More particularly, the Hello packet generator 34 adds the routing information of the selected target node and the number of routes, to the Hello packet. In step S58, the Hello packet generator 34 updates the entry of the selected target node to a status indicating a processed status of the entry, and the process returns to step S51. Hence, the entry of the routing table having the target node is updated to the processed status.

When the unprocessed entry no longer exists in the routing table Tt and the judgment result in step S51 becomes NO, the Hello packet generator 34, in step S59, refers to the adjacent node table Ty, and generates the routing data of the Hello packet from the entries of the adjacent node table Ty. More particularly, the Hello packet generator 34 refers to the adjacent node table Ty to acquire information of the adjacent nodes, and sets the acquired information in the Hello packet. In step S60, the Hello packet transmitter 33 of the node 5 sends the Hello packet that is generated by the Hello packet generator 34, and the Hello packet sending process ends.

Figure 26:
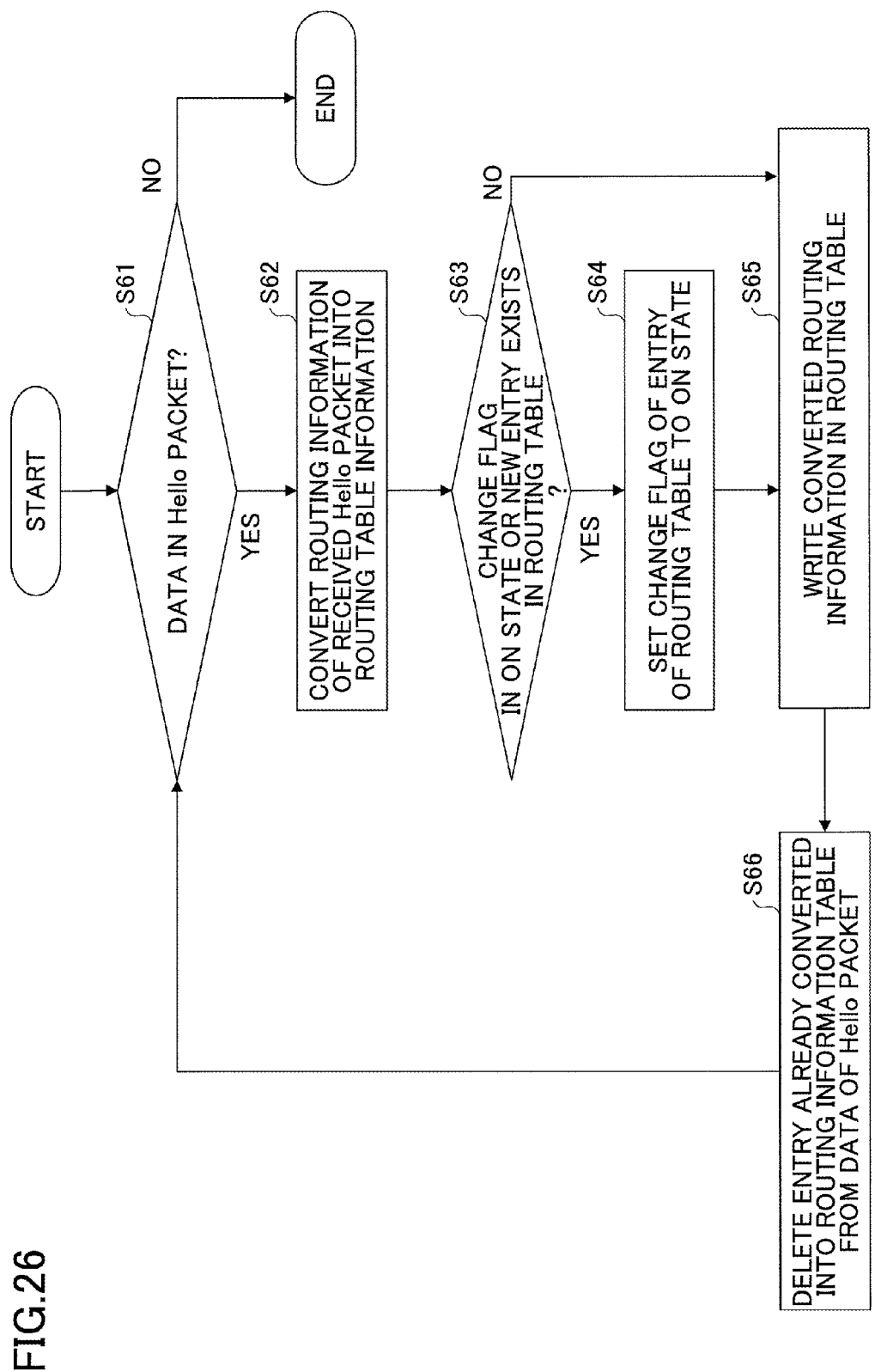
FIG. 26 is a flow chart for explaining an example of a receiving process to receive Hello packets at the node.

FIG. 26 is a flow chart for explaining an example of the receiving process to receive the Hello packets at the node. The Hello packet receiving process illustrated in FIG. 26 is executed by step S29 illustrated in FIG. 13. In step S61 illustrated in FIG. 26, when the Hello packet receiver 31 of the node 5 receives the Hello packet, the Hello packet receiver 31 judges whether the received Hello packet includes data. In a case in which the received Hello packet includes the data and the judgment result in step S61 is YES, the routing information extractor 32 of the node 5, in step S62, converts the data included in the received Hello packet, that is, the routing information, into routing table information. More particularly, the routing information extractor 32 converts the relay node in the routing information included in the Hello packet into the sending source node of the Hello packet, for example, and counts up the number of hops, h. In addition, in a case in which the target node and the relay node have a plurality of identical routes in the routing information included in the Hello packet, the routing information extractor 32 regards the total number of routes of each of the routes as the number of routes. In other words, in step S62, the routing information extractor 32 converts the routing information of the received Hello packet into the entries of the routing table Tt.

In step S63, the routing information extractor 32 judges whether the change flag F in the Hello header of the received Hello packet is in the on state, or whether a new entry exists in the routing table Tt, and the process advances to step S65 that will be described later when the judgment result in step S63 is NO. On the other hand, when the change flag F in the Hello header of the received Hello packet is in the on state, or a new entry exists in the routing table Tt, and the judgment result in step S63 is YES, the process advances to step S64. In step S64, the routing information extractor 32 sets the change flag F of the entry of the routing table Tt to the on state, and the process advances to step S65.

In step S65, the routing information extractor 32 of the node 5 writes the routing information converted by the routing information extractor 32 to the routing table Tt. In step S66, the routing information extractor 32 deletes the entry that is already converted into the routing table information, from the data included in the received Hello packet, and the process returns to step S61.

With respect to the data included in the Hello packet, the routing information extractor 32 of the node 5 performs processes (steps S62 through S65) from a conversion process that converts the routing information into the routing table information to a write process that writes the routing table information to the routing table Tt, until unprocessed entry no longer exists. On the other hand, in a case in which the Hello packet does not include data and the judgment result in step S61 is NO, that is, at a time of sending the first Hello packet, the routing information extractor 32 of the node 5 ends the Hello packet receiving process.

Figure 27:
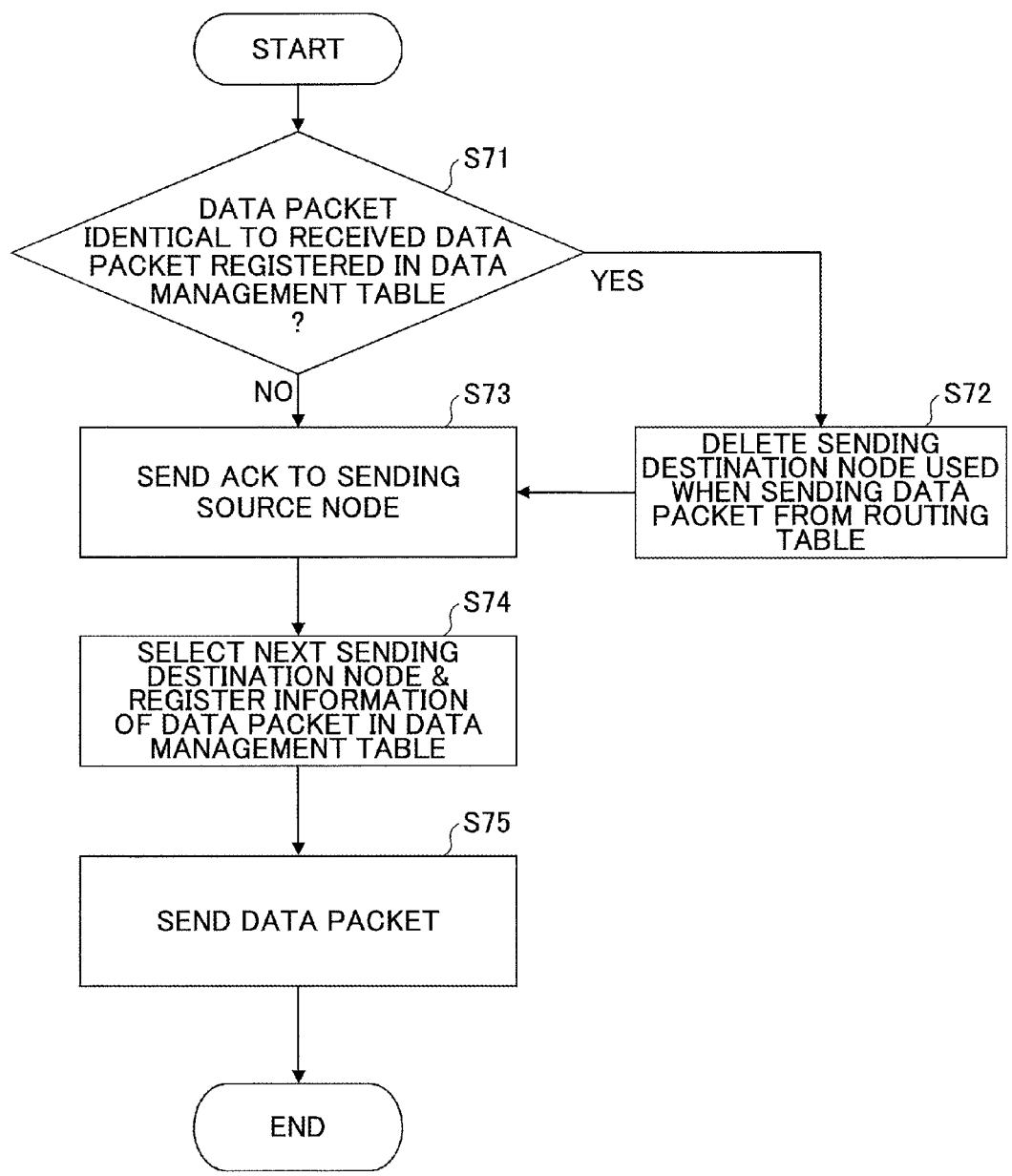
FIG. 27 is a flow chart for explaining an example of a receiving process to receive data packets at the node.

FIG. 27 is a flow chart for explaining an example of the receiving process to receive the data packets at the node. The data packet receiving process illustrated in FIG. 27 is executed by step S30 illustrated in FIG. 13. In step S71 illustrated in FIG. 27, when the data packet receiver 44 of the node 5 receives the data packet, the data packet receiver 44 judges whether an entry corresponding to the received data packet is registered in the data management table Tm. In a case in which the entry corresponding to the received data packet is registered in the data management table Tm and the judgment result in step S71 is YES, the process advance to step S72. In step S72, the route selector 42 of the node 5 deletes the information of the sending destination node corresponding to the entry, used when sending the data packet, from the routing table Tt.

In a case in which an entry corresponding to the received data packet is not registered in the data management table Tm and the judgment result in step S71 is NO, or after step S72, the process advances to step S73. In step S73, the data packet receiver 44 sends the ACK, indicating receipt of the data packet, to the sending source node of the data packet, regardless of whether the entry corresponding to the received data packet is registered in the data management table Tm.

In step S74, the route selector 42 refers to the routing table Tt, selects the next sending destination node of the data packet, and registers the information of the data packet in the data management table Tm. In step S75, the data packet transmitter 43 of the node 5 sends the data packet, and the data packet receiving process ends.

Figure 28:
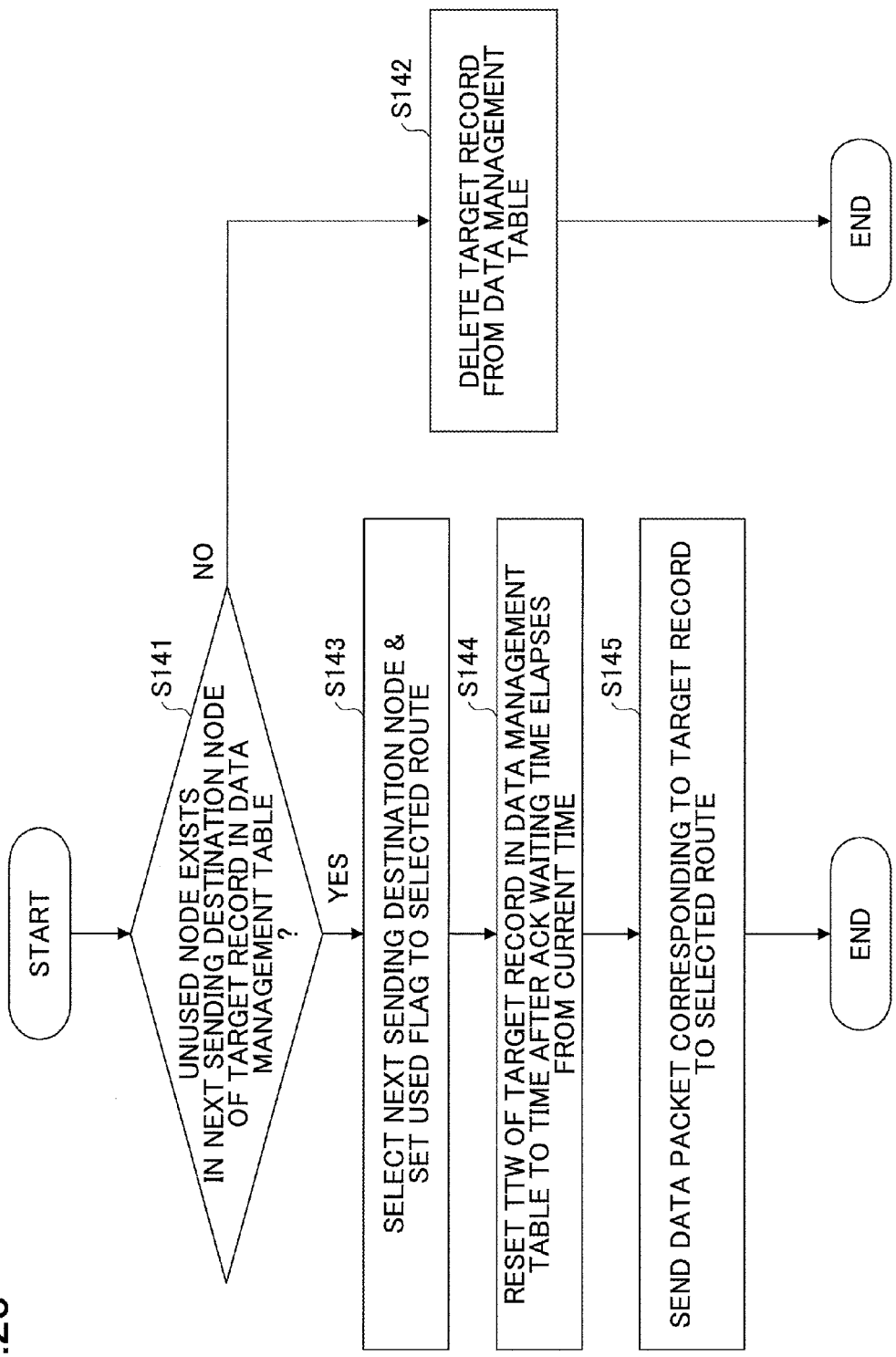
FIG. 28 is a flow chart for explaining an example of a resending process to resend data packets at the node.

FIG. 28 is a flow chart for explaining an example of the resending process to resend the data packets at the node. The data packet resending process illustrated in FIG. 28 is executed by step S22 illustrated in FIG. 13. In step S141 illustrated in FIG. 28, the route selector 42 of the node 5 judges whether an unused node exists in the next sending destination node of a target record in the data management table Tm. In a case in which no unused node exists in the next sending destination node of the target record in the data management table Tm and the judgment result in step S141 is NO, the process advances to step S142. In step S142, the route selector 42 deletes the target record from the data management table Tm, and the data packet resending process ends. On the other hand, in a case in which an unused node exists in the next sending destination node of the target record in the data management table Tm and the judgment result in step S141 is YES, the process advances to step S143.

In step S143, the route selector 42 selects the next sending destination node of the target record in the data management table Tm, and sets a used flag to the selected route. In step S144, the route selector 42 resets the time TTW of the target record in the data management table Tm to a time after the ACK waiting time elapses from the current time (that is, a resending time of the data packet). In step S145, the data packet transmitter 43 of the node 5 sends the data packet corresponding to the target record to the selected route, and the data packet resending process ends. After resending of the data packet, the next time TTW is waited. If the ACK is not returned by the next time TTW, and the remains an unused route, the data packet resending process described above is executed again.

FIGS. 29A, 29B, and 29C are diagrams illustrating an example of the records of the data management table. For the sake of convenience, FIGS. 29A, 29B, and 29C illustrate only a part of the data management table Tm. In this example, records of the data management table Tm include the time, the sending node, a record identifier FID, the time TTW, and sending destination nodes LD1, LD2, and LD3. In FIGS. 29A, 29B, and 29C, a left column under the column of the sending destination node LDi (i=1 to 3) indicates the used flag that is set to "1" when the sending destination node LDi is used, and a right column under the column of the sending destination node LDi indicates the name of the sending destination node.

FIG. 29A illustrates the record at a time when the node e illustrated in FIG. 16 receives the first data packet from the sending node a, and "1" and "g" in the left and right columns under the column of the sending destination node LD1 indicate that the data packet is sent to the node g. FIG. 29B illustrates the record after sending of the data packet to the node g fails in FIG. 29A, and the data packet is resent. In FIG. 29B, "1" and "h" in the left and right columns under the column of the sending destination node LD2 indicate that the data packet is sent to the node h. FIG. 29C illustrates the record after sending of the data packet to the node h fails in FIG. 29B, and the data packet is resent. In FIG. 29C, "1" and "i" in the left and right columns under the column of the sending destination node LD3 indicate that the data packet is sent to the node i.

Figure 30:
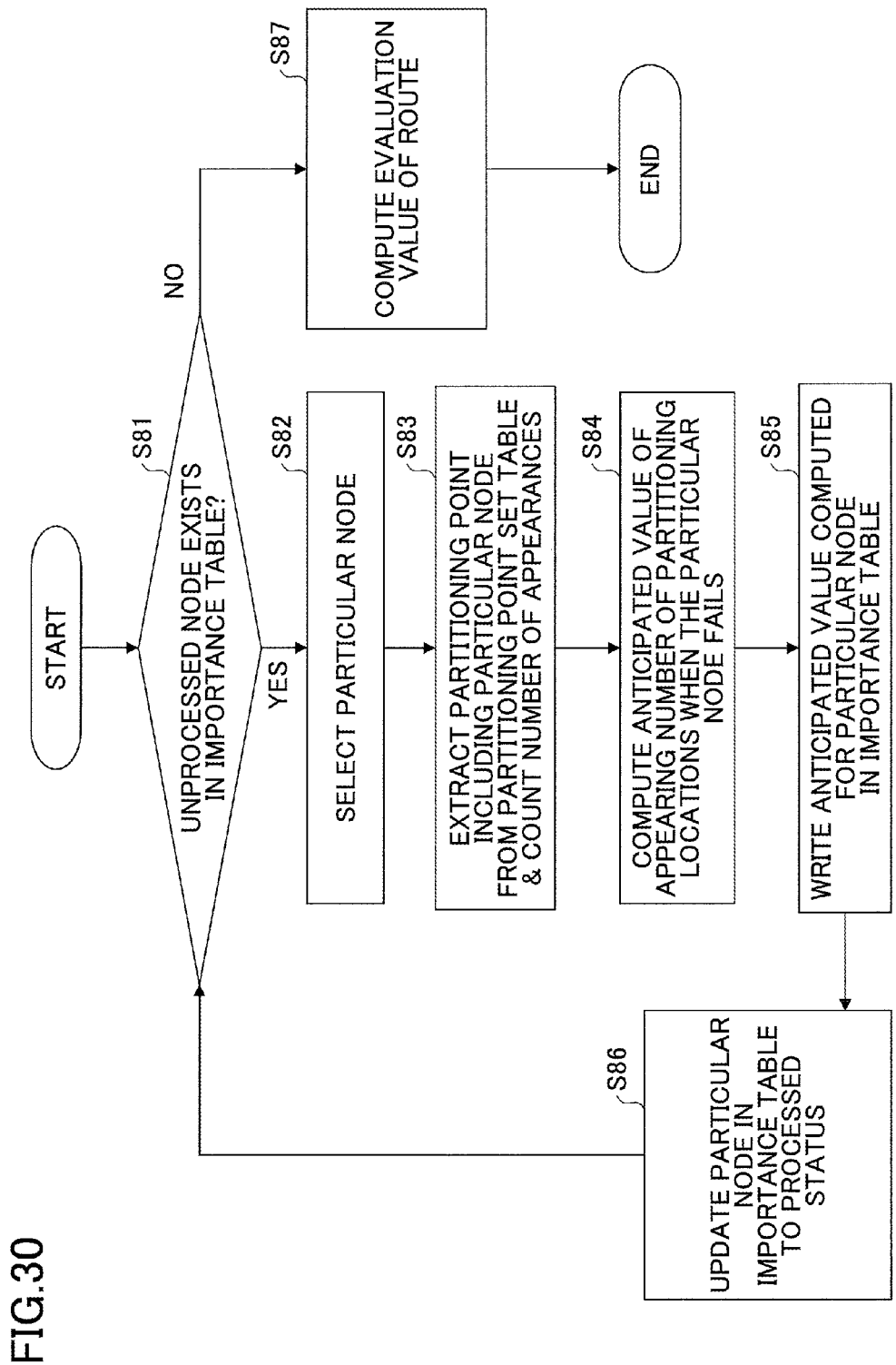
FIG. 30 is a flow chart for explaining an example of an importance generating process performed at a target node.

FIG. 30 is a flow chart for explaining an example of an importance generating process performed at the target node. The importance generating process illustrated in FIG. 30 is executed by the CPU 11 of the gateway GW, for example.

In step S81 illustrated in FIG. 30, the CPU 11 of the gateway GW judges whether an unprocessed entry of a node (hereinafter also referred to as an "unprocessed node") exists in the importance table. In a case in which the unprocessed node exists in the importance table and the judgment result in step S81 is YES, the process advances to step S82. When recomputing the partitioning point set described above with respect to the entire ad hoc network system 1, it may be regarded that all of the nodes of the ad hoc network system 1 are unprocessed nodes whose entries in the importance table are all unprocessed entries. For this reason, in step S82, the CPU 11 of the gateway GW selects a particular node. In step S83, the CPU 11 of the gateway GW extracts the partitioning points including the selected, particular node from the partitioning point table, and counts a number of appearances of each of the partitioning points.

Figures 31A, 31B:
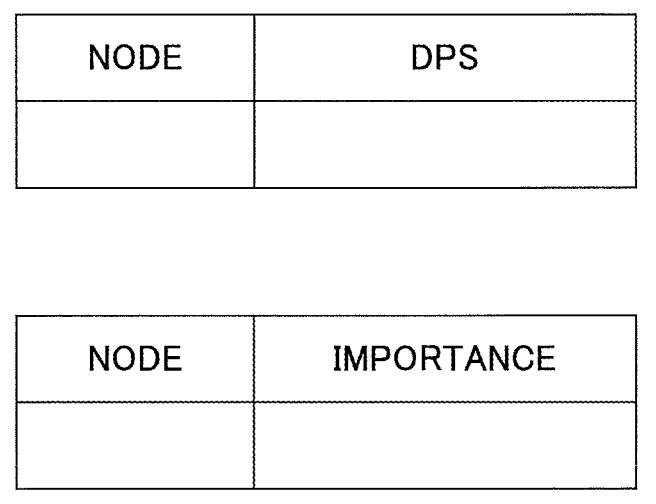

FIGS. 31A and 31B are diagrams illustrating an example of the partitioning point table and the importance table at the target node. FIG. 31A illustrates the partitioning point table, and FIG. 31B illustrates the importance table. The partitioning point table is generated by the gateway GW (that is, the target node), based on the partitioning point set DPS included in the Hello header of the Hello packet received from the relaying node. The partitioning point table includes the node, and the partitioning point set DPS corresponding to the node. On the other hand, the importance table is generated by the gateway GW (that is, the target node), based on the partitioning point set DPS included the Hello header of the Hello packet received from the relaying node. The importance table includes the node, and the importance corresponding to the node. The partitioning point table and the importance table are included in the various tables 22 stored in the memory 12 of the gateway GW, for example.

In step S84, the CPU 11 of the gateway GW computes an anticipated value of the appearing number of partitioning locations when the particular node fails, based on the counted value of the number of appearances of the partitioning points. In step S85, the CPU 11 of the gateway GW generates, as a partitioning probability representing the importance, as the anticipated value of the appearing number of partitioning locations computed for the particular node, and writes the anticipated value in the importance table illustrated in FIG. 31B as the partitioning probability representing the importance. In step S86, the CPU 11 of the gateway GW updates the status of the particular node to the processed status in the importance table, and the process returns to step S81.

In a case in which no unprocessed node exists in the importance table and the judgment result in step S81 is NO, the process advances to step S87. In step S87, the CPU 11 of the gateway GW refers to the importance table, and computes the evaluation value of the route from the importance of the node, and the importance generating process ends. The evaluation value of the route indicates a higher priority order for higher importance of the node, for example. In step S87, the CPU 11 of the gateway GW may judge the priority order of maintenance related to the maintenance target node, by adding the priority order to the maintenance target node based on the evaluation value of the route computed from the importance of the node. In addition, the priority order of the maintenance related to the maintenance target node may be judged by the user based on the importance of the importance table. Hence, it is possible to efficiently attend to the maintenance of a large number of nodes, based on the priority order of the maintenance target nodes, even in a case in which only a small number of personnel is above to attend to the maintenance, for example.

The node in this embodiment can compute, in a simple manner, the number of routes at each node, by transmitting and receiving existing control packets (for example, Hello packets). In addition, the node in this embodiment can acquire the number of routes at each node by slightly increasing the data size of the existing control packet by an amount corresponding to a field to store the number of routes and an amount corresponding to a field to store the partitioning point set, without increasing the number of types of the control packets nor increasing the number of packets. The node can acquire the total number of routes between the sending source node and the sending destination node, by slightly increasing the data size of the existing data packet. Moreover, it is possible to constantly store the most recent number of routes in the node, in a simple manner, using existing resources. Furthermore, the gateway can compute the partitioning probability, as the importance, from the partitioning point set acquired from the node.

On the other hand, according to the general method, the adjacent table of each node is sent to an aggregate node, and the number of routes is computed at the aggregate node based on the adjacent table of each node. For this reason, the processing load on the aggregate node is high, and the process to form the routes at the aggregate node and the process to form the routes at each node become redundant. In addition, when the adjacent table is periodically sent to the aggregate node, the number of packets increases to thereby increase the load on the network. In the case in which sending of the adjacent table is confirmed, it becomes necessary to send a control packet such as the ACK or the like in order to confirm the sending of the adjacent table, and the number of control packets increases. Consequently, the network assumes a high-load state, and it may take a long time to send the adjacent table to the aggregate node.

More particularly, according to the general method, when it is assumed for the sake of convenience that the adjacent table is periodically collected, the amount of data associated with the adjacent table sending process may be computed from a formula {(number of all nodes)×(average size of adjacent table)×(average length of route)×(table data collecting frequency)}. Because the adjacent table includes information of all adjacent nodes, the size of the adjacent table increases according to an increase in the number of nodes. In addition, in a case in which the control packet such as the ACK packet is required, the amount of data associated with the adjacent table sending process increases by an amount of data for the ACK, namely, {(number of all nodes)×(ACK packet size)×(average length of route)}.

On the other hand, the node in this embodiment does not require the adjacent table to be transmitted and received, and the number of routes at each node can be computed by adding the information of the number of routes to the existing control packet. More particularly, the amount of data that increases in this embodiment may be computed from a formula {(number of all nodes)×1 byte (size of numerical field storing number of routes)×(sending frequency of Hello packet)}. In addition, the amount of data that increases in the number of routes reaching the relaying node while relaying the data packet may be computed from a formula [(number of all nodes)×1 byte (size of numerical field storing number of routes)×{(average length of route)−1}×(sensor data collecting frequency)].

Therefore, according to this embodiment, it is unnecessary to newly prepare a control packet, and the amount of data that increases due to computing the number of routes is small.

In addition, in a distributed implementation described above, the partitioning point set is computed within each node, and the computed result is notified and shared between the nodes using the Hello packet. In this distributed implementation, there is an advantage in that it is unnecessary to consider congestion or delay of traffic associated with the sending of the data of the routing table. However, a centralized implementation is also possible, in which the data of the routing table is once collected at one node, such as the gateway, and all of the processes are performed at the one node.

According to the embodiment described above, it is possible to detect, at a high speed, the node that is the maintenance (or repair) target in the network system including a large number of nodes, by computing the evaluation value of the route from the importance of each node for each of the multiplexed routes, and assigning the priority order to the target node based on the computed evaluation value.

As an example of an application to a system that requires a completeness of the sensor data to be guaranteed, it is possible to apply the method of the described embodiment to a system that treats accounting data. Every single data in the accounting data may introduce a big problem. For this reason, when collecting such accounting data in the sensor network system, it is important to cope with the facility stop occurs due to the failure in the sensor network system. In a case in which preventive measures (for example, replacing hold equipment) are taken in order to minimize the possibility of a failure being generated, only limited number of resources can be allocated for the preventive measures. For this reason, it is possible to suppress the risk of data loss in the network system as a whole, by starting the maintenance (or repair) from the node which is likely to greatly affect the entire network system. Alternatively, even after the failure is actually generated within the network system, it is possible to suppress the risk of data loss by judging an urgency of each of the plurality of failures that are generated, and coping with the plurality of failures according to the priority order (or urgency) of the failures.

According to the embodiment, the importance of the wireless terminal can be computed within a short time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal of a network system in which routes amongst a plurality of nodes are dynamically adjusted according to an environment,
   wherein the wireless terminal forms a target node forming a final destination of data sent from a sending node,
   the wireless terminal comprising:
   a processor configured to perform a process including
      computing a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system; and
      generating an importance representing an effect of a failure of the relaying node on the network system by a transmission failure probability,
   wherein, in a case in which a number of relaying nodes from one node to the target node is one, a partitioning point formed at the one relaying node is added to the partitioning point set of the one relaying node, and regarded as a partitioning point set of the one node, and
   wherein, in a case in which the number of relaying nodes from the one node to the target node is two or more, the two or more relaying nodes themselves are respectively added to the partitioning point set of each of the two or more relaying nodes.

2. The wireless terminal as claimed in claim 1, wherein the processor performs the process further including
   computing an evaluation value of the routes from the importance of each of multiplexed nodes in each of the routes,
   wherein a priority order is assigned to a node that becomes a maintenance target based on the evaluation value, to narrow down the nodes that are maintenance targets.

3. The wireless terminal as claimed in claim 1, wherein the importance is set higher for higher partitioning probabilities.

4. The wireless terminal as claimed in claim 1, wherein the processor performs the process further including deleting a partitioning point having a number of elements exceeding an upper limit from the partitioning point set.

5. An importance generating method for generating an importance of each of a plurality of nodes in a network system in which routes amongst the plurality of nodes are dynamically adjusted according to an environment, the importance generating method comprising:

storing in a memory, by each of the plurality of nodes, a partitioning point set of partitioning points where the plurality of nodes partition routes within the network system, by checking the partitioning points;

sending, by each of the plurality of nodes, a packet including the partitioning point set to other nodes mutually coupled to each of the plurality of nodes;

computing, by a target node that forms a final destination of data sent from a sending node, a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system; and generating an importance representing an effect of a failure of the relaying node on the network system by a transmission failure probability, wherein, in a case in which a number of relaying nodes from one node to the target node is one, a partitioning point formed at the one relaying node is added to the partitioning point set of the one relaying node, and regarded as a partitioning point set of the one node, and wherein, in a case in which the number of relaying nodes from the one node to the target node is two or more, the two or more relaying nodes themselves are respectively added to the partitioning point set of each of the two or more relaying nodes.

6. The importance generating method as claimed in claim 5, further comprising:

computing an evaluation value of the routes from the importance of each of multiplexed nodes in each of the routes; and assigning a priority order to a node that becomes a maintenance target based on the evaluation value, to narrow down the nodes that are maintenance targets.

7. The importance generating method as claimed in claim 5, further comprising:

receiving by each of the plurality of nodes, from the other nodes mutually coupled thereto, a packet including routing information that indicates routes for the packet to the target node, and a number of routes of each of the routes; and storing, in the memory by each of the plurality of nodes, the routing information and the number of routes of each of the routes.

8. The importance generating method as claimed in claim 7, further comprising:

checking, by each of the plurality of nodes, the partitioning point set for a case in which a failure is generated in the wireless terminal, excluding the wireless terminal from each of the partitioning points and changing remaining elements to partitioning points, and excluding identical partitioning points and partitioning points in a higher layer.

9. The importance generating method as claimed in claim 5, wherein the importance is set higher for higher partitioning probabilities.

10. The importance generating method as claimed in claim 5, wherein the sending node and the relaying node are wireless terminals, and the target node is a gateway.

11. The importance generating method as claimed in claim 5, further comprising:

deleting, by each of the plurality of nodes, a partitioning point having a number of elements exceeding an upper limit from the partitioning point set.

12. The importance generating method as claimed in claim 11, further comprising:

in a case in which a change occurs in the partitioning point set of one of the plurality of nodes due to recomputation, making a notification requiring recomputation of the partitioning point set from the one of the plurality of nodes to another of the plurality of nodes beyond a route where the change occurs.

13. A wireless communication system comprising:

a network system in which routes amongst the plurality of nodes are dynamically adjusted according to an environment, wherein each of the plurality of nodes includes a processor configured to perform a process including storing, in a memory, a partitioning point set of partitioning points where the plurality of nodes partition routes within the network system, by checking the partitioning points; and sending a packet including the partitioning point set to other nodes mutually coupled to each of the plurality of nodes;

wherein the processor of a target node that forms a final destination of data sent from a sending node performs a process including computing a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system; and generating an importance representing an effect of a failure of the relaying node on the network system by a transmission failure probability, wherein, in a case in which a number of relaying nodes from one node to the target node is one, a partitioning point formed at the one relaying node is added to the partitioning point set of the one relaying node, and regarded as a partitioning point set of the one node, and wherein, in a case in which the number of relaying nodes from the one node to the target node is two or more, the two or more relaying nodes themselves are respectively added to the partitioning point set of each of the two or more relaying nodes.

14. The wireless communication system as claimed in claim 13, wherein the processor of each of the plurality of nodes performs the process further including deleting a partitioning point having a number of elements exceeding an upper limit from the partitioning point set.

15. The wireless communication system as claimed in claim 14, wherein, in a case in which a change occurs in the partitioning point set of one of the plurality of nodes due to recomputation, the processor of the one of the plurality of nodes performs the process further including
makinga notification requiring recomputation of the partitioning point set to another of the plurality of nodes beyond a route where the change occurs.

16. A non-transitory computer-readable storage medium having stored therein a program which, when executed by a computer, causes the computer to perform a process of a target node forming a final destination of data sent from a sending node in a network system in which routes amongst a plurality of nodes are dynamically adjusted according to an environment, the process comprising:
computing a partitioning probability indicating whether transmission fails by partitioning a location with respect to each pair of a sending source node and a sending destination node, based on a partitioning point set included in a packet received from a relaying node within the network system, wherein the partitioning point set includes partitioning points where nodes partition routes within the network system; and
generating an importance representing an effect of a failure of the relaying node on the network system by a transmission failure probability,
wherein, in a case in which a number of relaying nodes from one node to the target node is one, a partitioning point formed at the one relaying node is added to the partitioning point set of the one relaying node, and regarded as a partitioning point set of the one node, and
wherein, in a case in which the number of relaying nodes from the one node to the target node is two or more, the two or more relaying nodes themselves are respectively added to the partitioning point set of each of the two or more relaying nodes.

17. The non-transitory computer-readable storage medium as claimed in claim 16, wherein the program, when executed by the computer, causes the computer to perform the process further comprising:
computing an evaluation value of the routes from the importance of each of multiplexed nodes in each of the routes,
wherein a priority order is assigned to a node that becomes a maintenance target based on the evaluation value, to narrow down the nodes that are maintenance targets.

18. The non-transitory computer-readable storage medium as claimed in claim 16, wherein the program, when executed by the computer, causes the computer to perform the process further comprising:
deleting a partitioning point having a number of elements exceeding an upper limit from the partitioning point set.

* * * * *